United States Patent
Skaanning

(10) Patent No.: US 7,016,056 B2
(45) Date of Patent: Mar. 21, 2006

(54) AUTHORING TOOL FOR BAYESIAN NETWORK DIAGNOSTIC SYSTEMS

(75) Inventor: Claus Skaanning, Dronninglund (DK)

(73) Assignee: Hewlett-Packard Development Company, L.P., Houston, TX (US)

( * ) Notice: Subject to any disclaimer, the term of this patent is extended or adjusted under 35 U.S.C. 154(b) by 928 days.

(21) Appl. No.: 09/738,716

(22) Filed: Dec. 16, 2000

(65) Prior Publication Data
US 2002/0044296 A1    Apr. 18, 2002

Related U.S. Application Data

(63) Continuation-in-part of application No. 09/388,891, filed on Sep. 2, 1999, now abandoned.

(51) Int. Cl.
G06K 15/00    (2006.01)

(52) U.S. Cl. .................................. 358/1.13; 358/1.18

(58) Field of Classification Search ................ 358/1.1, 358/1.14, 1.13, 1.18; 706/46, 47, 50, 55, 706/59, 61
See application file for complete search history.

(56) References Cited

U.S. PATENT DOCUMENTS 4,965,742 A * 10/1990 Skeirik ......................... 700/86
5,596,712 A * 1/1997 Tsuyama et al. .............. 714/26

* cited by examiner

Primary Examiner—Arthur G. Evans

(57) ABSTRACT

An authoring tool assists an author in building an automated diagnostic system. The authoring tool includes a cause editor interface, an action editor interface and a question editor interface. The cause editor interface allows an author to place, in a cause data structure, information pertaining to causes. The action editor interface allows an author to place, in an action data structure, information pertaining to actions that can be taken in response to the causes. The question editor interface allows an author to place, in a question data structure, information pertaining to questions that can be asked a user of the product to help identify causes.

32 Claims, 15 Drawing Sheets

Explanation editor for causes, actions and questions

AUTHORING TOOL FOR BAYESIAN NETWORK DIAGNOSTIC SYSTEMS

CROSS REFERENCE TO RELATED APPLICATION

This application is a continuation-in-part of application Ser. No. 09/388,891, filed Sep. 2, 1999 now abandoned.

BACKGROUND

The present invention pertains to support of products and pertains particularly to an authoring tool for Bayesian network diagnostic systems.

Currently, it is highly expensive for printer manufacturers to diagnose the systems of their customers. Typically, a customer calls a printer call agent at the manufacturer. This call agent guides the customer through a troubleshooting sequence that leads to resolution of the problem or identification of the cause. This method requires the intervention of a call agent which results in a high cost.

When using call agents the printer manufacturer hires many call-agents which the customer in turn can call when he experiences problems with his printer system. The call-agent attempts to gather as much information as possible by interviewing the customer over the phone. When he reaches the conclusion, he will either have solved the problem, identified the cause, or had to dispatch a field agent that will attempt to resolve the problem at the customer site.

One drawback of using call-agents is the expense. In addition, there can be problems with consistency in the order and types of troubleshooting steps used by different call agents. It is a problem if customers are not given approximately the same troubleshooting steps in the same order with similar problems, as they may then feel confused. Also, the call agent solution allows only limited logging of information, has only limited integration of programmatic data-collectors, and very limited integration of multi-media presentations. Use of call-agents however, does provide the benefit of human-to-human communication between the call agent and the customer as the call agent will obviously be able to detect soft information that a computer-based system cannot easily detect, such as, e.g., whether the customer is irritated with some line of questioning, the level of experience of the customer, and so on.

Decision trees can be used to provide automated diagnosis of printer systems. The decision-tree approach specifies the possible troubleshooting sequences as a so-called decision tree. At each branching of the tree, one of the branches will be chosen based on the information provided by the customer at the last step. However, decision-trees are static in the sense that for practical reasons it only allows a limited number of possible sequences of the troubleshooting steps. With decision-trees all sequences that should be available to the customer have to be encoded and as the size of the decision tree is exponential in the number of these, it is only possible to encode a limited number of them. This on the average will cause the decision tree to provide longer troubleshooting sequences with lower probability of actually diagnosing the problem, as it is not possible to take all possible scenarios into account.

Case-based reasoning can also be used to provide automated diagnosis of printer systems. The case-based approach gathers a high amount of descriptive cases from troubleshooting scenarios where various problems are seen. Based on information about the current situation, the case-based reasoning engine can then select the cases that are most similar. The most similar cases are then investigated to find the best next action or question that has the highest likelihood to rule out as many cases as possible. This continues until the single case that matches most the current situation is determined.

Case-based systems gather cases that are descriptive of the troubleshooting domain and use these cases to suggest actions and questions that as quickly as possible narrows the scope down to a single case. The quality of a case-based system hinges on its case database which has to be very large to adequately describe a printer system domain. The possible configurations/cases in a printer system are $2^N$ for N variables ($10^{24}$ for 80 variables), if all the variables are binary. A subset of cases out of these would have to be extremely large to be sufficiently descriptive to be useful to a case-based system. Thus, it is doubtful that case-based systems will be successful in representing the printing system with its many variables to an optimal level of accuracy.

Rule-based systems can also be used to provide automated diagnosis of printer systems. Rule-based systems can be perceived as a subset of Bayesian networks, as they can be represented with Bayesian networks. They have a subset of the modeling capabilities of Bayesian networks, and the belief updating methods are not guaranteed correct as they are with Bayesian networks.

Rule-based systems, however, have updating methods that are not optimal when there are loops in the model. Loops are very common in models of real-world systems (e.g., common causes, troubleshooting steps that fixes several causes, etc.).

One troubleshooter based on Bayesian networks is described by Heckerman, D., Breese, J., and Rommelse, K. (1995), *Decision-theoretic Troubleshooting, Communications of the ACM*, 38:49–57 (herein "Heckerman et al. 1995").

A Bayesian network is a directed acyclic graph representing the causal relationships between variables, that associates conditional probability distributions to variables given their parents. Efficient methods for exact updating of probabilities in Bayesian networks have been developed. See for example, Lauritzen, S. L., and Spiegelhalter, D. J. Local Computations with Probabilities on Graphical Structures and their Applications to Expert Systems. *Journal of the Royal Statistical Society, Series B*, 50(2):157–224 (1988), and Jensen, F. V., Lauritzen, S. L., and Olesen, K. G., *Bayesian Updating in Causal Probabilistic Networks by Local Computations, Computational Statistics Quarterly*, 4:269–282 (1990). Efficient methods for exact updating of probabilities in Bayesian networks have been implemented in the HUGIN expert system. See Andersen, S. K., Olesen, K. G., Jensen, F. V. and Jensen, F., *HUGIN—a Shell for Building Bayesian Belief Universes for Expert Systems, Proceedings of the Eleventh International Joint Conference on Artificial Intelligence*. (1989).

Bayesian networks provide a way to model problem areas using probability theory. The Bayesian network representation of a problem can be used to provide information on a subset of variables given information on others. A Bayesian network consists of a set of variables (nodes) and a set of directed edges (connections between variables). Each variable has a set of mutually exclusive states. The variables together with the directed edges form a directed acyclic graph (DAG). For each variable v with parents $w_1, \ldots, w_n$, there is defined a conditional probability table $P(v|w_1, \ldots, w_n)$. Obviously, if v has no parents, this table reduces to the marginal probability $P(v)$.

Bayesian networks have been used in many application domains with uncertainty, such as medical diagnosis, pedigree analysis, planning, debt detection, bottleneck detection, etc. However, one of the major application areas has been diagnosis. Diagnosis (i.e., underlying factors that cause diseases/malfunctions that again cause symptoms) lends itself nicely to the modeling techniques of Bayesian networks.

The currently most efficient method for exact belief updating of Bayesian networks is the junction-tree method that transforms the network into a so-called junction tree, described in Jensen, F. V., Lauritzen, S. L., and Olesen, K. G., *Bayesian Updating in Causal Probabilistic Networks by Local Computations, Computational Statistics Quarterly,* 4:269–282 (1990). The junction tree basically clusters the variables such that a tree is obtained (i.e., all loops are removed) and the clusters are as small as possible. In this tree, a message passing scheme can then update the beliefs of all unobserved variables given the observed variables. Exact updating of Bayesian networks is NP-hard (Cooper, G. F., *The Computational Complexity of Probabilistic Inference using Bayesian Belief Networks, Artificial Intelligence,* 42:393–405, (1990)), however, it is still very efficient for some classes of Bayesian networks. The network for the printing system contains several thousand variables and many loops, but can still be transformed to a junction tree with reasonably efficient belief updating.

Heckerman et al. 1995 presents a method for performing sequential troubleshooting based on Bayesian networks.

For a device to troubleshoot that has n components represented by the variables $c_1, \ldots, c_n$, Heckerman et al. 1995 follow the single-fault assumption that requires that exactly one component is malfunctioning and that this component is the cause of the problem. If $p_i$ the probability that component $c_i$, is abnormal given the current state of information, then $\sum_{i=1}^{n} p_i = 1$ under the single-fault assumption. Each component $c_i$ has a cost of observation, denoted $C_i^o$ (measured in time and/or money), and a cost of repair $C_i^r$.

Under some additional mild assumptions not reproduced here (see Heckerman et al. 1995 for more information), it can then be shown that with failure probabilities $p_i$ updated with current information, it is always optimal to observe the component that has the highest ratio $p_i/C_i^o$. This is intuitive, as the ratio balances probability of failure with cost of observation and indicates the component with the highest probability of failure and the lowest cost of observation. Under the single-fault assumption, an optimal observation-repair sequence is thus given by the plan set out in Table 1 below:

TABLE 1

| Step 1: | Compute the probabilities of component faults $p_i$ given that the device is not functioning. |
| Step 2: | Observe the component with the highest ratio $p_i/C_i^o$. |
| Step 3: | If the component is faulty, then repair it. |
| Step 4: | If a component was repaired, then terminate. Otherwise, go to step 1. |

In the plan described in Table 1 above, if a component is repaired in step 3, it is known from the single-fault assumption that the device must be repaired, and the troubleshooting process can be stopped. The algorithm works reasonably well if the single-fault assumption is lifted, in which case step 1 will take into account new information gained in steps 2 and 3, and step 4 will be replaced as in Table 2 below:

TABLE 2

| Step 1: | Compute the probabilities of component faults $p_i$ given that the device is not functioning. |
| Step 2: | Observe the component with the highest ratio $p_i/C_i^o$. |
| Step 3: | If the component is faulty, then repair it. |
| Step 4: | If the device is still malfunctioning, go to step 1. |

Heckerman et al. 1995 introduces a theory for handling a service call that is used when the expected cost of the most optimal troubleshooting sequence is higher than the cost of a service call (e.g., calling the manufacturer for assistance). The theory changes to the above plan that enables it to approximately handle systems with multiple faults and non-base observations. Non-base observations are observations on something that is not a component but potentially provides useful information for the troubleshooting process. In a companion paper (Breese, J. S. and Heckerman, D., *Decision-theoretic Troubleshooting: A Framework for Repair and Experiment,* Technical Report MSR-TR-96-06, (1996) Microsoft Research, Advanced Technology Division, Microsoft Corporation, Redmond, USA), the method is further advanced to also enable configuration changes in the system to provide further useful information that can potentially lower the cost of the optimal troubleshooting sequence.

However, the Bayesian-network based troubleshooters described by Heckerman et al. 1995 have a one-to-one correspondence between causes and actions which does not hold in reality, have myopic (one-step lookahead) selection of questions, and have too slow selection of questions when there are many of them. Furthermore, Heckerman et al. 1995 presents no method of knowledge acquisition for their troubleshooters.

SUMMARY OF THE INVENTION

In accordance with a preferred embodiment of the present invention, an authoring tool assists an author in building an automated diagnostic system. The authoring tool includes a cause editor interface, an action editor interface and a question editor interface. The cause editor interface allows an author to place, in a cause data structure, information pertaining to causes. The action editor interface allows an author to place, in an action data structure, information pertaining to actions that can be taken to in response to causes. The question editor interface allows an author to place, in a question data structure, information pertaining to questions that can be asked a user of the product to help identify causes.

In the preferred embodiment, the authoring tool additionally comprises a library of modules, at least one of the modules containing diagnostic information about a component of a product. The author can select modules from the library of modules when building the automated diagnostic system for the product.

For example, the information pertaining to causes relates to the following categories: name of the cause, parent of the cause, explanation of the cause, and probability of the cause being present. The information pertaining to the cause may additionally relate, for example, to the following categories: cause category, dependency on environment, and indication that a customer is not to access this cause information.

The information pertaining to an action relates, for example, to the following categories: name of the action, explanation of the action, causes solved by the action, probabilities that the action solves specified causes, and an indication whether the action is for information-gathering or is a potential solution. The information pertaining to the action also may relate, for example, to the following categories: an indication as to whether the action should be taken before other actions, an indication as to whether the action is a workaround, costs of taking the action, trustworthiness of the answer to the action, additional actions included with the action, whether the action can only be performed after a specified question has been answered, and whether the action cannot be performed after a specified question has been answered.

The information pertaining to a question, for example, relates to the following categories: name of the question, explanation of the question, number of answers, names of answers, and costs of answers. The information pertaining to the question also may additionally relate, for example, to the following categories: whether the question can only be performed after a specified question has been answered, whether the question cannot be performed after a specified question has been answered, an indication as to whether the question should be asked before other questions, and whether the question is a symptom question or a general question. When information pertaining to the question particularly pertains to a symptom question, the information may additionally relate, for example, to the following categories: causes of the symptom, probability of answers to the question conditional on causes of the symptom, and probability of answers to the question conditional on none of the causes that can cause the symptom. When information pertaining to the question particularly pertains to a general question, the information may additionally relate, for example, to the following categories: prior probabilities of answers to the question, causes that are affected by answers to the question, and probability of the affected causes conditional on each answer to the question.

In the preferred embodiment, the cause editor interface allows an author to create new cause entries and delete and edit existing cause entries. The action editor interface allows an author to create new action entries, and delete and edit existing action entries. The question editor interface allows an author to create new question entries, and to delete and edit existing question entries.

An authoring tool in accordance with the preferred embodiment of the present invention greatly decreases the time requirements of knowledge acquisition. The authoring tool is structured such that the author is guided through a series of questions that allows him to specify only the absolute minimum amount of information. The authoring tool is structured such that information of the domain is specified in ways that are proven to be natural and intuitive to the domain experts. The authoring tool is structured such that knowledge of Bayesian networks is not required, thus, a Bayesian network expert is no longer required to be present during the knowledge acquisition (KA) process. Also, initial construction of diagnostic models for error conditions in the domain in question will be relatively slow, however, through the reuse of modules the authoring speed will increase as more and more modules in the domain will be built.

The authoring tool allows swift maintenance of prior constructed diagnostic systems. Prior to the existence of the authoring tool, direct manipulation of the underlying Bayesian network was required to modify the behavior of a diagnostic system. However, with the authoring tool, the required changes can be performed on a representation much more suited to the purpose. Further, due to reuse of modules, a change in a module can be propagated to all the places where this module is used. Thus, time requirements for maintenance of diagnostic system models are decreased greatly.

The authoring tool allows swift migration from one product to the next. As diagnostic information is arranged in a modular manner, it is a quick and easy process to migrate a diagnostic system for one product to the next by simply considering only the modules that have changed. With many product series, there are only few changes between different versions, different revisions and or different models. The required changes usually reside in clearly defined modules. Further, when creating initial diagnostic models for a product, information that is likely to change with the next model can be flagged. Thus when migrating these models, the authoring tool can display the flagged information for consideration by the domain expert. In this way time requirements for migration can be decreased by the arrangement of information in modules and flagging of information likely to change between models.

The preferred embodiments of the invention allow the knowledge acquisition to be performed by the people with the knowledge of the domain, that is, the domain experts. No expertise with Bayesian networks, diagnostic algorithms, etc., is necessary. Thus, the authoring tool described herein allows the minimal labor possible to generate diagnostic systems.

DESCRIPTION OF THE PREFERRED EMBODIMENT

Figure 1:
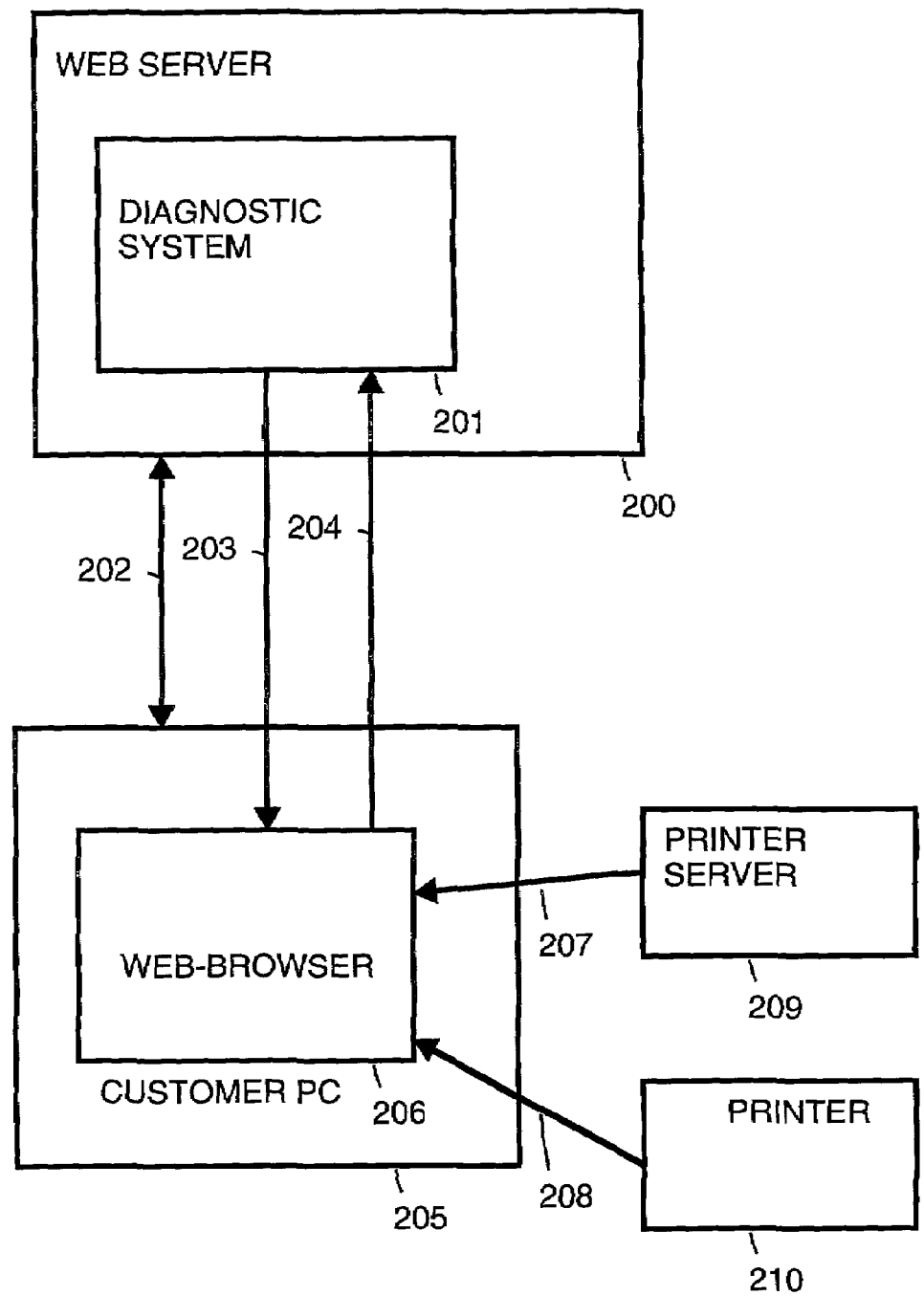
FIG. 1 is an overview of a diagnostic environment in accordance with a preferred embodiment of the present invention.

FIG. 1 is an overview of a diagnostic environment in accordance with a preferred embodiment of the present invention.

FIG. 1 shows a web-server 200, a customer personal computer (PC) 205, a printer server 209 and a printer 210. A printer system diagnostic system 201 runs on a web-server 200.

A diagnostic system is used, for example, for decision support, selection, classification, prediction, and or brokering.

In decision support, a user is taken through a sequence of questions leading him to the optimal solution to a problem. For example, decision support aids a user in making the right decision with regard to some problem. For example, a system for automated customer support operations (SACSO) decision support engine uses a sequence of questions to determine the true underlying problem, and can then suggests solutions to the problem.

To perform knowledge acquisition used to provide decision support, a domain in which to carry out the decision support is identified. Also identified are possible situations within the domain, possible sub-situations of the possible selections and informational steps. The informational steps are matched to the possible situations and the possible sub-situations. Probabilities are estimated for the possible situations the possible sub-situations. Also estimated are probabilities for actions and questions set out in the informational steps and costs for actions and questions set out in the informational steps.

In selection, a diagnostic system runs through a sequence of questions that aids the user in selecting between a number of possibilities. Multiple selections can be made. For example, a student uses the diagnostic system to design an optimal curriculum of classes. By asking him questions, the diagnostic system attempts to determine the areas where the student needs training (skills gap analysis), and the diagnostic system can then suggest classes that target these specific areas. This is not completely general decision support. It is decision support in the manner that it aids the user to identify the situation that the use is looking at, and then suggests a solution. Causes correspond to situations. Informational steps correspond to diagnostic steps. In this case actions provide solutions, and questions gather information like in a diagnostic system.

To perform knowledge acquisition used to provide selection, a domain in which to carry out the selection is identified. Also identified are possible situations within the domain, possible sub-situations of the possible selections and informational steps. The informational steps are matched to the possible situations and the possible sub-situations. Probabilities are estimated for the possible situations the possible sub-situations. Also estimated are probabilities for actions and questions set out in the informational steps and costs for actions and questions set out in the informational steps. Causes correspond to selections. Informational steps correspond to diagnostic steps and are used to gather information useful for narrowing in on a selection.

In classification, a diagnostic system can be used to classify something according to a number of categories. For example, the diagnostic system can be used for path analysis, e.g., directing customer feedback e-mails to the correct person. Directing customer feedback e-mails to the correct person could entail, for example, classifying an e-mail into one of a number of categories, based on tags or keywords extracted from the e-mail.

In prediction, a diagnostic system can be used to create predictive systems. Basically, potential future causes are modeled instead of current causes, and questions that look for symptoms of future problems are modeled.

Brokering is a variant of selection where a diagnostic system is used to broker among a list of possible solutions. For example, an e-speak broker that needs to perform a more intelligent brokering between competing e-services can use a diagnostic system to do this by carrying out a more intelligent comparison of e-service parameters.

Printer diagnostic system 201 is used herein as an example of a diagnostic system. Printer diagnostic system 201 is used for diagnosing operation of a printing system. A user on customer PC 205 can access diagnostic system 201 over Internet 202. A web-browser 206 within customer PC 205 is used to access web-server 200. In response to the customer's interaction with diagnostic system 201, diagnostic system 201 responds with suggestions 203 for diagnostic steps that the customer can perform. Diagnostic system 201 essentially functions as an expert system that utilizes artificial intelligence. The customer provides information 204 back to diagnostic system 201 which informs diagnostic system 201 on the outcome from acting on suggestions 203. Information 204 may include information 207 the customer obtains from printer server 209 and/or information 208 the customer obtains from printer 210.

Figure 2:
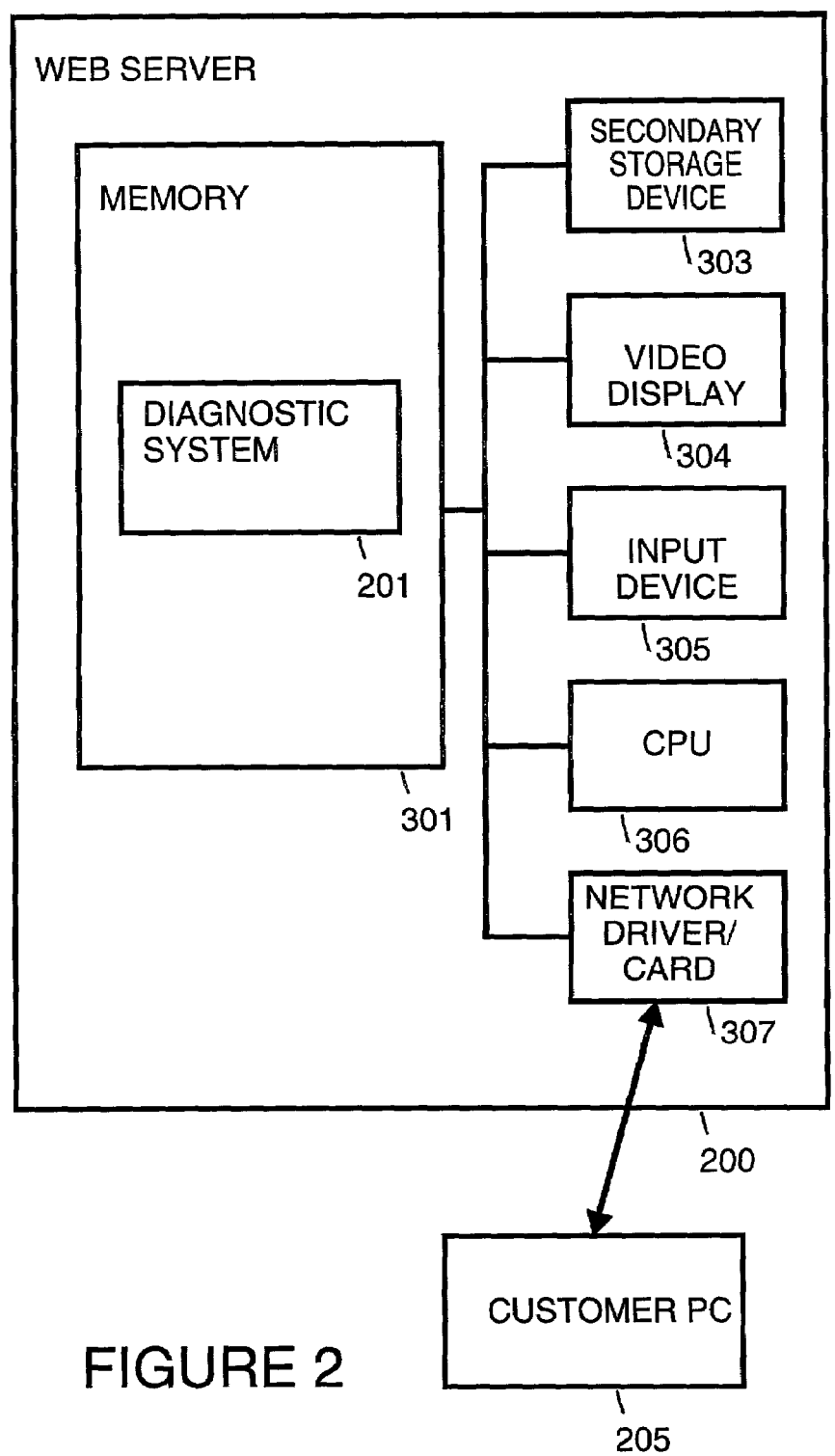
FIG. 2 is a simplified block diagram of a web server in accordance with a preferred embodiment of the present invention.

FIG. 2 is a simplified block diagram of web-server 200. Diagnostic system 201 executes in a memory 301 of web-server 200. Diagnostic system 201 utilizes secondary storage devices 303 for storage of diagnostic models. A video display 304 can be used by a technician to monitor the diagnostic process and to maintain the diagnostic models. Web server 200 also includes an input device 305, such as a keyboard, a CPU 306 and a network card 307 for communication with web-browser 206 in customer PC 205.

Figure 3:
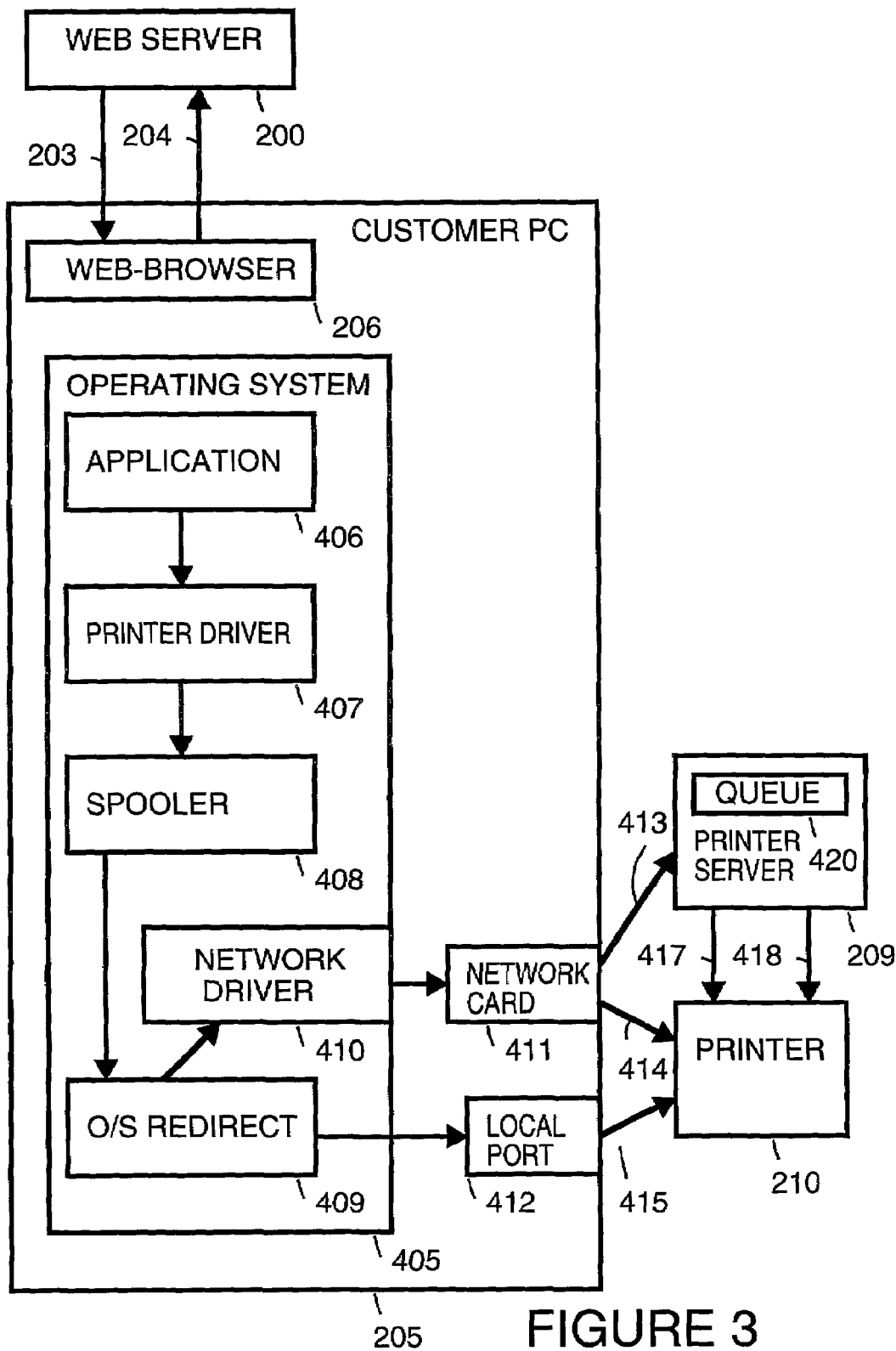
FIG. 3 is a simplified block diagram of components within a customer personal computer used in the diagnostic process in accordance with a preferred embodiment of the present invention.

FIG. 3 is an overview of the components of the diagnostic process. Web-server 200 is shown. The customer communicates with diagnostic system 201 (shown in FIG. 1) within web-server 200 through web-browser 206 running on customer PC 401. The customer receives suggestions 203 from diagnostic system 201 and in return provides answers 204. The customer uses diagnostic system 201 when experiencing a malfunction in the printer system which consists of printer server 209 and printer 210. In general, when a customer attempts to print from an application 406, the print job first goes to a printer driver 407, then through a local spooler 408, if utilized, and then to an operating system (O/S) redirect 409. O/S redirect 409 is the part of the operating system that determines which way the print job goes, i.e., to a network connection 413 via a network driver 410 and a network card 411, or to a local port 412 in the case of a local parallel connected printer. If the print job goes to a local parallel connected printer, the print job goes through a parallel cable 415 before reaching printer 210. If the print job goes to a network printer, it either goes through network connection 413 to printer server 209, or through a direct network connection 414 to printer 210. Direct network connection 414 may be utilized for certain printers, e.g., the HP LaserJet 5Si available from Hewlett-Packard Company, having a business Address of 3000 Hanover Street, Palo Alto, Calif. 94304. When printer 210 is controlled by printer server 209, the print job goes through a printer queue 420 in printer server 209, and then the print job is sent across either a network connection 417 to printer 210, or a parallel cable 418, depending upon how printer 210 is connected to printer server 209.

Application 406, printer driver 407, spooler 408 and O/S redirect 409 all execute in operating system 405 on customer PC 205. When printing a print job from application 406, the print job follows one of the above-described paths on its way to printer 210, depending on the system setup. If anything goes wrong along the way, this can result in no output or unexpected output. Diagnostic system 201 will, through tests on components in the system, attempt to determine which component(s) caused the problem.

Figure 4:
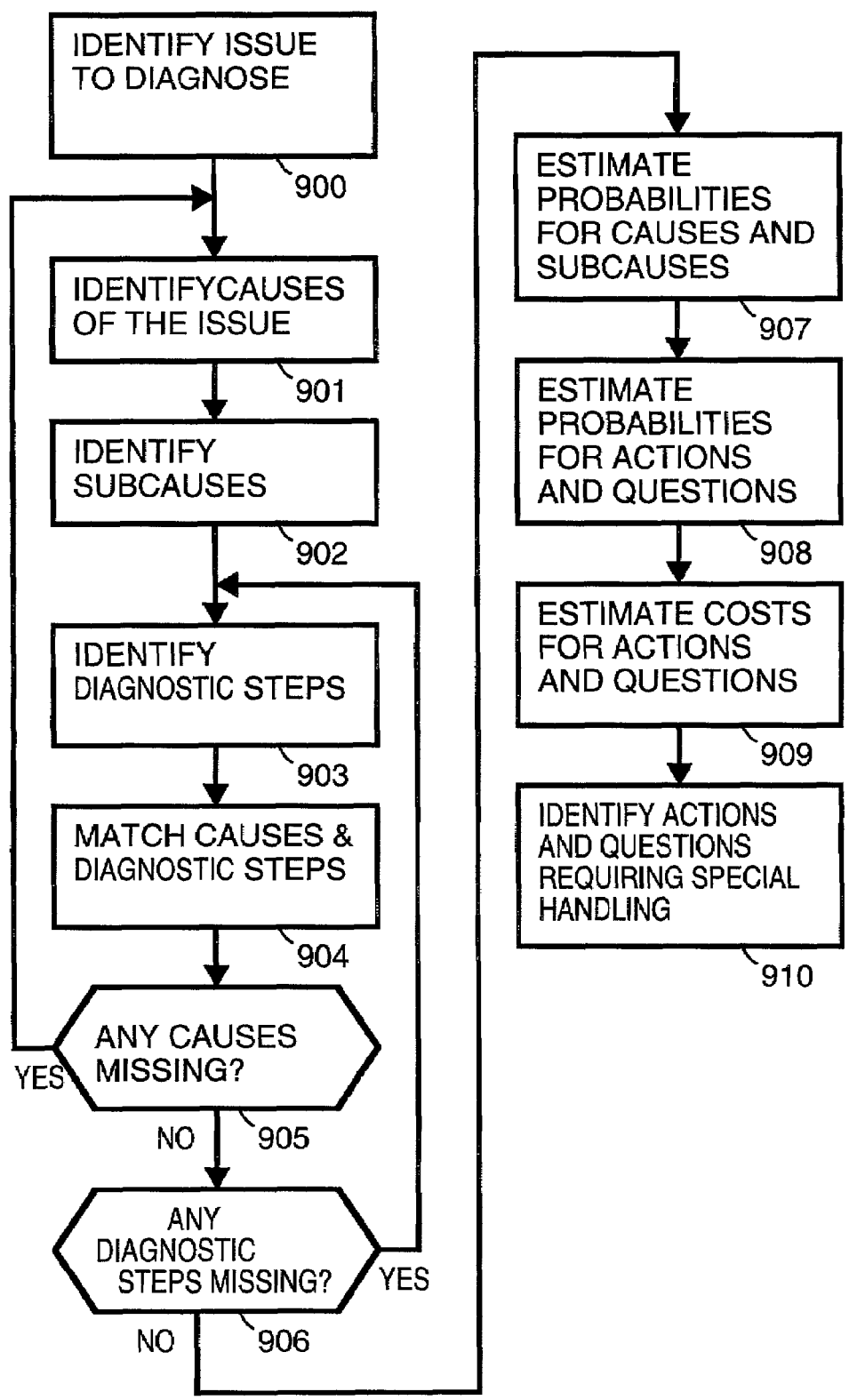
FIG. 4, is an overview of steps to perform knowledge acquisition in accordance with a preferred embodiment of the present invention.

FIG. 4, is an overview of steps to perform knowledge acquisition in order to implement diagnostic system 201. The knowledge acquisition process is the process of constructing the diagnostic models by gathering sufficient information about the domain from so-called domain experts. The domain experts are familiar with the domain that is being modeled, in this case printer systems. These domain experts have intimate knowledge of the domain under consideration, having assisted in the construction phase, diagnostic or support phase of the product. The knowledge acquisition process has to be guided by someone familiar with the rules and requirements of the process. Participating in or guiding the knowledge acquisition process requires no expertise in the area of Bayesian networks. To aid in illustration, the problem of "light print" is used as an example throughout discussion of the steps disclosed in FIG. 4. "Light print" is the problem of the user receiving an output from the printer that is lighter than expected.

In a step 900, the issues to diagnose are identified. The problem that is being modeled is identified, defined precisely and separated from other problems. Initially, it is very important to precisely define the problem under consideration and the audience of the diagnostic tool, as this will have a large impact on the following knowledge acquisition steps. The skill level of the audience is important when specifying both causes and steps, as there are causes and steps that cannot be manipulated by end users, but can be manipulated by experienced diagnostic systems. In the following, it is assumed that there is an audience of end users that have only rudimentary understanding of the printer system, but can be guided to perform complicated steps.

In a step 901, causes of the issue are identified. In this step, the domain experts identify the causes of the problem under consideration. Causes are basically all the different components, properties or events that can cause the problem.

It is usually impossible and/or not necessary to identify and specify all causes, as there are causes that are too rare to be worth considering e.g., gravity out of specification causing printing problems or causes that cannot be affected by the user anyway e.g., advanced technical problems with printer components. These causes are then gathered in a single leak cause termed "other problems" which further has two subcauses representing respectively "temporary problems" that can be solved by power cycling the printer, and "permanent problems" that cannot be solved by the user.

One of the difficulties in identifying causes is the decision of whether to group sets of causes as a single cause or whether to keep the causes separate. As a rule of thumb it is easier to do the knowledge acquisition for actions, if causes for which there are different actions are kept separate.

For example, for the problem of "light print" the following causes and subcauses were identified as set out in Table 3 below:

TABLE 3

| Cause/Subcause | Explanation |
|---|---|
| Media | If the paper is of such a type that the toner doesn't stick correctly to it, this can cause light print. |
| Paper path dirty | If the paper path is dirty there is a chance that this causes lighter print. Environmental conditions - humidity, temperature, etc. can all cause lighter print if they are extreme. |
| Toner cartridge problems | Problems with the toner cartridge can cause lighter print, e.g., if the cartridge is low on toner. |
| Transfer roller problems | The transfer roller allows the toner image on the drum surface to be transferred to or placed on the media and can thus also cause light print. Incorrect application settings - obviously there are settings that can cause light print, if set incorrectly, both in the application, printer driver and on the control panel of the printer itself |
| Incorrect printer driver settings Incorrect control panel settings | |
| Corrupt data flow | There is a slight change that the print job can be corrupted somewhere in the flow from the application through the network to the printer, such that it prints out lighter than expected. |
| Wrong driver used | Using the incorrect driver for the printer can cause light print. |
| Other problems | As mentioned above there are causes of light print that it is not worth considering and they are gathered under this heading |

Experience has shown that modeling the causes at this level, closely resembles the manner of thinking employed by experienced printing system call agents. When they diagnose printer problems over the phone, they maintain in their minds a list of the causes and subcauses similar to the above, and continually adjust the beliefs of the different causes based on the conversation with the customer.

In a step 902, subcauses, if any, are identified. Often, it is convenient to organize causes into categories. These categories are then seen as causes with a number of subcauses. It is not strictly necessary to use subcauses of causes, as it is entirely possible to have all subcauses on the same top level. However, this approach often leads to a high number of causes on the top level, making the acquisition of probabilities more difficult. Organizing the causes into a hierarchy allows the domain expert to consider fewer causes at a time when estimating probabilities, thus providing more accurate information.

While in FIG. 4 there are only represented two levels of the cause-structure, there can be arbitrarily many levels of causes and subcauses.

The finished hierarchy of causes for "light print" is as is set out in Table 4 below:

TABLE 4

1) Media
2) Paper path dirty
3) Environmental conditions
4) Toner cartridge problems
    a) Defective toner cartridge
    b) Improperly seated toner cartridge
    c) Toner distribution - this includes low on toner and other problems with the toner fluid.
5) Transfer roller problems
    a) Defective or dirty transfer roller
    b) Improperly seated transfer roller
    c) Worn out transfer roller
6) Incorrect application settings
    a) Economode/draft mode on - economode is set to save toner, and thus causes a lighter print than ordinarily.
    b) 300/600 dpi set to 300 dpi - 300 dpi may cause lighter print than 600 dpi prints.
    c) Other settings set wrong - other settings that may cause light print.
7) Incorrect printer driver settings
    a) Economode set on
    b) 300/600 dpi set to 300 dpi
    c) Other settings set wrong
8) Incorrect control panel settings
    a) Economode/draft mode set on
    b) 300/600 dpi set to 300 dpi
    c) Print density set too low
9) Corrupt data flow
10) Wrong driver used
11) Other problems
    a) Temporary problem
    b) Permanent problem In a step 903, diagnostic steps of the issue are identified. Actions that can solve any of the causes of the problem, and questions that can provide information regarding the causes are listed.

When listing the diagnostic steps of a problem, the domain experts basically consider the steps they themselves would perform or suggest for the customer to perform, if they were faced with the problem. Experience shows that it is beneficial to start out listing the steps without considering the previously listed causes, i.e., with a "blank" mind, as this will occasionally bring otherwise forgotten steps into mind. Then, when these first steps have been listed, it is good to consider the list of causes an add all steps that potentially solve these causes.

When listing diagnostic steps, only steps that can be performed by the assumed audience of the diagnostic system should be listed, e.g., if the audience is end users, it is irrelevant to suggest steps that require a high technical understanding of the printing system to be performed successfully. There are also steps that carry a high risk of breaking something else when performed by inexperienced users, that should not be included. Step that require highly expensive requisites are also step that should not usually be included.

Again, the domain expert faces the problem of size and coverage of steps. There are diagnostic procedures that can be equivalently modeled as a single step or a series of steps. The rule of thumb here is that it depends on the user interface and the step itself how to represent a step. If the step can be conveniently represented as a deterministic flow-diagram if-then-else structure, and the user interface of the diagnostic system support the implementation of such deterministic "programs", then the step should be modeled as a single step. If the flow-diagram of the step includes uncertain/probabilistic decisions, the step has to be represented as multiple steps.

There are two main categories of diagnostic steps, actions and questions. The first category, actions, are steps that require the user to perform some kind of the intervention in the system, and report back to the diagnostic system whether the action solved the problem or not, Thus actions have the potential to solve the problem. The second category, questions, are steps that require the user to obtain some information related with the problem at hand possibly by intervening with the system, and report back the result to the diagnostic system. Questions are grouped into two subcategories, information-gathering actions and general questions.

Information-gathering actions are actions that do not have the potential to solve the problem. They merely provide information, that is relevant to solving the problem. Ordinary actions are also termed solution actions to distinguish them from the information-gathering actions. It is important to distinguish, as the two types of actions are handled differently in the diagnostic algorithms, as further described below where information-gathering actions are treated as questions. To clarify, this means that algorithmically there is not difference between information-gathering actions and questions. However, the distinction is kept during knowledge acquisition as it is easier for domain experts to elicit probabilities for information-gathering actions if they are treated as actions.

The distinction between information-gathering and solution actions should also be clarified. Solution actions have the potential to solve the problem while information-gathering actions cannot possibly solve the problem. Information-gathering actions only have the potential to temporarily remove the problem while some change to the environment is tried out.

General questions are the remaining questions that are not information-gathering actions. Questions do not have the potential to solve the problem, and can have any number of answers as opposed to actions that only have two: yes (it helped) and no (it didn't).

When listing the diagnostic steps of a problem, they must be categorized as either solution actions (SA), information-gathering actions (IA) or questions (Q).

For all actions and questions, explanations should be written as early in the knowledge acquisition process as possible, as these explanations/definitions help to reduce future confusion and ensure that errors are caught as early as possible.

For the "light print" problem, the following steps were identified, as set out in Table 5 below:

TABLE 5

A) Ensure that media is within specifications (SA)
B) Try another toner cartridge that is within specification (IA)
C) Remove, shake and reinsert toner cartridge (SA)
D) Reseat transfer roller (SA)
E) Try different media (IA)
F) Perform printer maintenance kit (SA)
G) Power cycle the printer (SA)
H) Ensure that environmental conditions are within specifications (SA)
I) Clean the inside of the printer according to the user manual (SA)
J) Try another in-spec transfer roller (IA)
K) Ensure economode/draft more is not on in the application (SA)
L) Ensure 300 dpi is not set in the application (SA)
M) Examine and correct other application settings related to "light print" (SA)
N) Ensure economode is not on in the printer driver (SA)
O) Ensure 300 dpi is not set in the printer driver (SA)

TABLE 5-continued

P) Examine and correct other printer driver settings related to "light print" (SA)
Q) Ensure economode/draft more is not on on the control panel of the printer (SA)
R) Ensure 300 dpi is not set on the control panel of the printer (SA)
S) Ensure print density is not set too low on the control panel (SA)
T) Diagnose the data flow (SA)
U) Ensure that an in-spec up-to-date printer driver is used (SA)
V) Is the printer maintenance kit due? (Q)
W) Is the toner cartridge from a supported manufacturer? (Q)
X) Does the control panel say "Toner low"? (Q)
Y) Is the printer configuration page printed light? (Q)

A few of the above steps are classified as information-gathering actions, e.g., step B "Try another toner cartridge". If, after performing step B, the problem is removed, the problem is still not solved. The likely cause of the problem has been identified, but there are further investigations that could be done, and the other toner cartridge probably has to be returned to the place it came from, i.e., the problem is not solved. This is generally true for steps that replace a printer component with another—if they succeed, the scope of the diagnostic has been significantly narrowed down, but there are still remaining steps that can be performed to solve the problem completely.

Step F in Table 5 suggests performing the printer maintenance (PM) kit which must be performed every time a specific amount of pages has been printed. If the PM kit must be performed, the control panel of the printer will usually give a notification, but not necessarily always. It is a good idea to ask whether it is suggested on the control panel, before suggesting the PM kit, as the PM kit should only be performed if absolutely necessary.

Step T in Table 5 is a large and complicated diagnostic step consisting of a series of substeps attempting to determine whether the print job is corrupted somewhere in the dataflow, and identifying the source of the corruption. Basically, the entire dataflow model for corrupt output described below fits under step T and its associated cause.

In a step 904, causes and diagnostic steps are matched. The diagnostic steps are matched with the causes that they can solve. Additionally, the causes that are associated with questions are identified.

In this step the causes are matched with diagnostic steps such that actions are matched with the causes that they can solve, and questions are matched with the causes that they are associated with (i.e., affect the probabilities of).

For each action, $A_i$, it is considered for each cause, $C_j$, whether there is a non-zero probability that performing $A_i$ will solve $C_j$. If this is so, there is a match which is registered for later use in the knowledge acquisition process.

Information-gathering actions can be handled almost similarly to solution actions. Even though they are not able to solve the problem, they are still able to temporarily remove the problem while trying some change in the environment. For instance, in step B within Table 5 above, "Try another toner cartridge" will cause the problem to go away, if the cause is subcause 4a, 4b or 4c, as listed in Table 4 above. So, for information-gathering actions the causes for which the action will remove the problem when performed are still registered.

For each question, $Q_i$, it is considered for each cause, $C_j$, whether an answer to $Q_i$ will directly affect the belief in $C_j$ (i.e., cause the probability to decrease or increase).

Questions do not have to affect the beliefs of any causes at all as they are sometimes used to provide information about the diagnostic scenario, user type, etc. to allow/disallow related actions. An example of this could be a question about the type or manufacturer of certain components, the answer to which controls whether the component supports certain actions. Thus, the probability of these actions succeeding is zero when the manufacturer of the component is not of the right type.

For the "light print" problem, the matching of steps and causes is as shown in Table 6 below. After each action or question, the associated causes (keyed to Table 4 above) are listed:

TABLE 6

| Diagnostic Steps | Causes |
| --- | --- |
| A) Ensure that media is within specifications (SA) | 1 |
| B) Try another toner cartridge that is within specification (IA) | 4 |
| C) Remove, shake and reinsert toner cartridge (SA) | 4b, 4c |
| D) Reseat transfer roller (SA) | 5b, 11a |
| E) Try different media (IA) | 1 |
| F) Perform printer maintenance kit (SA) | 2, 5, 11a |
| G) Power cycle the printer (SA) | 11a |
| H) Ensure that environmental conditions are within specifications (SA) | 3 |
| I) Clean the inside of the printer according to the user manual (SA) | 2, 4b, 11a |
| J) Try another in-spec transfer roller (IA) | 5, 11a |
| K) Ensure economode/draft more is not on in the application (SA) | 6a |
| L) Ensure 300 dpi is not set in the application (SA) | 6b |
| M) Examine and correct other application settings related to "light print" (SA) | 6c |
| N) Ensure economode is not on in the printer driver (SA) | 7a |
| O) Ensure 300 dpi is not set in the printer driver (SA) | 7b |
| P) Examine and correct other printer driver settings related to "light print" (SA) | 7c |
| Q) Ensure economode/draft more is not on on the control panel of the printer (SA) | 8a |
| R) Ensure 300 dpi is not set on the control panel of the printer (SA) | 8b |
| S) Ensure print density is not set too low on the control panel (SA) | 8d |
| T) Diagnose the dataflow (SA) | 9 |
| U) Ensure that an in-spec up-to-date printer driver is used (SA) | 13 |
| V) Is the printer maintenance kit due? (Q) | 2, 5, 5c |
| W) Is the toner cartridge from a supported manufacturer? (Q) | 4 |
| X) Does the control panel say "Toner low"? (Q) | 4, 4c |
| Y) Is the printer configuration page printed light? (Q) | 1–5, 8, 11 |

In Table 6, diagnostic step V affects the beliefs of causes 2, 5 and 5c, according to the domain experts. If the PM kit is due, there is a higher belief on some of the causes that are targeted by the PM kit, i.e., (2) dirty paper path, (5) transfer roller problems in general, and (5c) worn out transfer roller specifically.

The question in diagnostic step Y requests information about a symptom—whether the configuration page is printed light. This is a symptom of causes 1–5, 8 and 11. These causes are the hardware causes that are still in effect when the configuration page is printed. The non-specified causes are software causes that have no effect in this situation. The acquisition of probabilities for questions is further described below.

In a step 905 a check is made to see if any new causes or subcauses have been identified. These may be identified, for example, when matching the causes and steps. If there are any new causes or subcauses identified, a return is made to step 901.

When matching the actions and questions with the causes that they are associated with, it often happens that causes are discovered for which there are no solution actions, and actions are discovered that cannot solve any causes, i.e., there are respectively actions and causes missing. When this occurs, it is necessary to go back to step 901.

In a step 906, a check is made to see if any new diagnostic steps have been identified, for example, when matching the causes and steps. If there are new diagnostic steps that have been identified, a jump is made back to step 903.

Causes and steps are often forgotten in the initial listing, and new causes and steps are often discovered when matching causes with steps. Therefore, it is optimal to perform the matching of causes and steps before eliciting the probabilities for causes, as this elicitation has to be performed partly over again each time a new cause is discovered.

In a step 907, probabilities of causes and subcauses are estimated. When there is a high degree of certainty that all causes have been listed, and causes and subcauses have been structured in a hierarchy, the probabilities of causes should be estimated. This is usually done bottom-up, so that the probabilities of subcauses given the cause are estimated first, and then the probabilities of causes given the problem.

The probabilities of subcauses are estimated first. The sets of subcauses are visited in sequence, such that a separate elicitation of probabilities is performed for each set of subcauses of the same cause. The probabilities of the subcauses are elicited assuming that the problem is present (e.g., "light print") and the cause is present (e.g., "toner cartridge problems"). When all probabilities of subcauses have been elicited, the probabilities of the causes are elicited, assuming that the problem is present.

Experience has shown that this method of probability elicitation where the probabilities are basically elicited against the causal direction (the subcauses cause the causes, and the causes cause the problem) is highly efficient as it provides the domain experts with maximum information to base their probabilities on as they are allowed to assume that the problem and/or the cause is present.

The usual procedure of eliciting the probabilities of a set of causes/subcauses is for one domain expert to give initial probabilities to most of the causes given the higher level cause—or at least a ranking (this is the highest, this is the next highest, etc.). Then the domain experts discuss the initial probabilities or rankings and adjust as a result of discussions. When final agreement is reached, the elicitation is closed.

The differences in belief that occur in the elicitation process are almost always due to a lack of knowledge by one of the domain experts, and it then takes a discussion to discover which of the domain experts are wrong. Most of the time agreement is reached quickly, and probabilities are adjusted to reflect this. However, occasionally it is necessary to confer with other experts to settle the disagreement.

When the disagreement in probabilities is very small (e.g., 0.05), a lengthy discussion is often deemed unnecessary and the average is chosen. However, when the disagreement is large, it is very important to reach a common understanding of the underlying domain structure, as this understanding may also help in future probability elicitations.

During the process of elicitation, a set of probabilities are developed for the causes under consideration. This set of probabilities does not necessarily have to be normalized (sum to 1.0) all the time. There is no reason not to be flexible and allow that the sum differs slightly from 1.0, as it would slow the process considerably if a sum of 1.0 has to be maintained at all times. When the elicitation is finished, it is easy to normalize the probabilities.

In one project, the domain experts preferred to elicit percentages instead of probabilities, such that 10.0% was used instead of 0.1, etc. This makes sense, as it is easier to work with numbers in the range 0–100 than in the range 0–1, as there are fewer decimals. Also, it is likely that they were used to thinking in percentages.

Obviously, there is always some amount of second-order uncertainty on the elicited probabilities. One standard method of representing this second-order uncertainty is to use probability intervals such that the domain expert states his/her belief that the probability is within a certain interval. When the domain experts have then agreed on a specific interval, there are methods that allows propagation of probability intervals in Bayesian networks. Rendering the second-order uncertainty explicit allows the domain expert to specify different size probability intervals for different probabilities, and the automated diagnostic system would be able to give its conclusions with the appropriate uncertainty.

For the problem of "light print", the following probabilities (in percentages) were elicited as set out in Table 7 below:

TABLE 7

| | |
|---|---|
| 1) Media | 12 |
| 2) Paper path dirty | 22 |
| 3) Environmental conditions | 6 |
| 4) Toner cartridge problems | 35 |
|    a) Defective toner cartridge | 10 |
|    b) Improperly seated toner cartridge | 5 |
|    c) Toner distribution | 85 |
| 5) Transfer roller problems | 20 |
|    a) Defective or dirty transfer roller | 25 |
|    b) Improperly seated transfer roller | 65 |
|    c) Worn out transfer roller | 10 |
| 6) Incorrect application settings | 45 |
|    a) Economode/draft mode on | 75 |
|    b) 300/600 dpi set to 300 dpi | 15 |
|    c) Other settings set wrong | 10 |
| 7) Incorrect printer driver settings | 27 |
|    a) Economode set on | 80 |
|    b) 300/600 dpi set to 300 dpi | 15 |
|    c) Other settings set wrong | 5 |
| 8) Incorrect control panel settings | 2 |
|    a) Economode/draft mode set on | 85 |
|    b) 300/600 dpi set to 300 dpi | 5 |
|    c) Print density set too low | 10 |
| 9) Corrupt data flow | 1 |
| 10) Wrong driver used | 15 |
| 11) Other problems | 10 |
|    a) Temporary problem | 10 |
|    b) Permanent problem | 90 |

In step 908, probabilities of actions and questions are estimated.

In the preferred embodiment, there are two types of questions, those that pertain to symptoms or effects of causes, and general questions that are not naturally seen as a symptom or an effect. The knowledge acquisition processes for the two types of questions are different, so it is important to determine the type of the question before eliciting the probabilities for it. The difference between these two types of questions is further elaborated below.

For general questions, the causes associated with the question, have been previously listed, i.e., the causes that will have their probabilities decreased or increased depending on the answer to the question. For this type of questions, the domain experts consider each answer to the question (e.g., yes, no, etc.) and estimate how much the probabilities of the affected causes will decrease or increase based on the new information. The elicitation proceeds much like the one for causes—there can be disagreements in understanding that have to be solved by discussions.

The domain experts focus on the causes that are affected by the answer to the question, thus the probabilities of causes that are not affected, are not modified by the experts. However, the fact that other causes are having their probabilities increased or decreased will cause the probabilities of the remaining to change accordingly, such that the sum is still 1.0. It is clearly easier for the experts to only adjust the probabilities that are directly affected, and then let the rest change accordingly, than having the experts assess the changes in all probabilities. Also, it was the experience that the experts were comfortable with letting the remaining probabilities change accordingly.

In the "light print" problem, the probabilities (in percentages) were adjusted as set out in Table 8 below, given the answer to the question "do you see toner low on the control panel?":

TABLE 8

|  | Yes | No |
|---|---|---|
| 1) Media | 12 |  |
| 2) Paper path dirty | 22 |  |
| 3) Environmental conditions | 6 |  |
| 4) Toner cartridge problems | 35 | −>90 |
| a) Defective toner cartridge |  | 10 |
| b) Improperly seated toner cartridge |  | 5 |
| c) Toner distribution | 85 | −>25 |
| 5) Transfer roller problems | 20 |  |
| a) Defective or dirty transfer roller |  | 25 |
| b) Improperly seated transfer roller |  | 65 |
| c) Worn out transfer roller |  | 10 |
| 6) Incorrect application settings | 45 |  |
| a) Economode/draft mode on |  | 75 |
| b) 300/600 dpi set to 300 dpi |  | 15 |
| c) Other settings set wrong |  | 10 |
| 7) Incorrect printer driver settings | 27 |  |
| a) Economode set on |  | 80 |
| b) 300/600 dpi set to 300 dpi |  | 15 |
| c) Other settings set wrong |  | 5 |
| 8) Incorrect control panel settings | 2 |  |
| a) Economode/draft mode set on |  | 85 |
| b) 300/600 dpi set to 300 dpi |  | 5 |
| c) Print density set too low |  | 10 |
| 9) Corrupt data flow | 1 |  |
| 10) Wrong driver used | 15 |  |
| 11) Other problems | 10 |  |
| a) Temporary problem |  | 10 |
| b) Permanent problem |  | 90 |

Thus, the probability of "toner cartridge problems" being the cause of the problem is raised to 0.9 when it is known that the control panel of the printer says toner low. As the probability of the subcause "toner distribution" is already high compared with the other subcauses of "toner cartridge problems", it was decided not to increase this probability further.

Similarly, knowing that the control panel does not say toner low, it was decided to decrease the probability of the subcause "toner distribution" from 0.85 to 0.25. However, it was decided to leave the overall probability of "toner cartridge problems" at 0.35, even if it is known that the control panel does not say toner low.

Also, for general questions the domain experts have to give prior probabilities for the answers to the question. It will be explained below how to check whether the experts have specified inconsistent information for general questions by analysing the unconditioned probability of the associated causes, P(C), the conditional probability, P(C|Q), and the priors on the question P(Q), i.e., by comparing $\Sigma_Q P(C|Q)P(Q)$ with P(C).

For questions about symptoms, the causes that are associated with the question are listed in step 904, shown in FIG. 4 and described above, that is, the causes that cause the symptom in question. Here, the elicitation consists of giving for each of the associated causes, the probability of the symptom given the cause. Also, the probability that the symptom appears if none of the specified causes are present should be estimated.

In the problem of "light print" (question Y in Table 5) "is the configuration page printed light?" is a symptom question. The probabilities (in percentages) were assessed as in Table 9 below:

TABLE 9

|  | Yes |
|---|---|
| 1) Media | 100 |
| 2) Paper path dirty | 100 |
| 3) Environmental conditions | 100 |
| 4) Toner cartridge problems | 100 |
| a) Defective toner cartridge |  |
| b) Improperly seated toner cartridge |  |
| c) Toner distribution |  |
| 5) Transfer roller problems | 100 |
| a) Defective or dirty transfer roller |  |
| b) Improperly seated transfer roller |  |
| c) Worn out transfer roller |  |
| 6) Incorrect application settings |  |
| a) Economode/draft mode on |  |
| b) 300/600 dpi set to 300 dpi |  |
| c) Other settings set wrong |  |
| 7) Incorrect printer driver settings |  |
| a) Economode set on |  |
| b) 300/600 dpi set to 300 dpi |  |
| c) Other settings set wrong |  |
| 8) Incorrect control panel settings | 100 |
| a) Economode/draft mode set on |  |
| b) 300/600 dpi set to 300 dpi |  |
| c) Print density set too low |  |
| 9) Corrupt data flow |  |
| 10) Wrong driver used |  |
| 11) Other problems | 50 |
| a) Temporary problem |  |
| b) Permanent problem |  |

The probability (as percentage) of symptom if none of the specified causes are present is 1.

Thus, the domain experts assessed that, e.g., if the cause is an incorrect control panel setting (cause 8 in Table 9 above), then there is a probability of 1.0 (100%) that the configuration page will be printed light, and similarly if the cause is either the media, the paper path, the environmental conditions, etc.

If the cause is "other problems", the experts assessed that with a probability of 0.5 the configuration page would be printed light. The reason this probability is not 1.0 is that some temporary and permanent problems will not have an effect on the printing of the configuration page.

The domain experts did not want to completely rule out the possibility that the configuration page could be printed light, even if none of the above specified causes were present, so they left a 0.01 probability for this situation.

For actions, it is necessary to determine the probability that the action solves the problem given each of the causes listed in step 904 of FIG. 4. These causes are assumed to be the causes that the action can potentially solve.

The diagnostic algorithms needs the probability of the actions solving the problem given previously obtained information about the problem—so the domain experts have to answer for each listed cause, $C_i$, assuming that $C_i$ is the only cause of the problem in question, what is the probability that performing the action solves the problem?

Experience shows that too many things have to be taken into account when estimating this probability, i.e., both the actual probability that the action solves the problem if it is performed correctly, but also the probability that the action is performed correctly. If too many things have to be taken into account and considered simultaneously, the result is probabilities of a low quality.

The estimates will be of higher quality if the above elicitation is split into two probability elicitation questions. The first probability elicitation question is, assuming that $C_i$ is the only cause of the problem in question, what is the probability that correctly performing the action solves the problem? The second probability elicitation question is, assuming that $C_i$ is the only cause of the problem in question, what is the probability that the user performs the action incorrectly without realizing it?

When answering the first probability elicitation question, the domain experts can assume that the action is performed correctly, and it is thus easier to assess the probability that it solves the problem. When answering the second probability elicitation question, the domain experts can concentrate on assessing the probability that the user performs the action incorrectly.

It is important to assess the probability that the user performs the action incorrectly without realizing it, and not the overall probability of performing the action incorrectly. This probability is needed to represent the possibility of incorrect feedback from the user. Incorrect feedback will be gotten in the situation where the user does not realize that he did the action incorrectly. So, the case where the user does realize that he did the action incorrectly is not included in the probability. In these situations, the user will not input incorrect feedback, but is likely to try performing the action again, or give as input that he was unable to perform the action.

If the probability found when answering the first probability elicitation question is denoted $P_1$, and the probability found when answering the second probability elicitation question is denoted $P_2$, the overall probability of the action solving the problem given cause $C_i$ is then found as:

$$P(A=yes|C_i=yes) = P_1(1-P_2)$$

Experience has shown that there is little variability in the probability assessed when answering the second probability elicitation question, also termed the inaccuracy of the user's response. Thus, it was sufficient to estimate a factor between 0 and 4 for the inaccuracy using the range: 0—very low, 1—low, 2—medium, 3—high, 4—very high. This inaccuracy factor can then be converted to a probability as in Table 10 below:

TABLE 10

| VL: | 0 |
|---|---|
| L: | 2% |
| M: | 5% |
| H: | 10% |
| VH: | 20% |

The conversion of inaccuracy factors to probabilities can be determined by a series of questions to the domain experts.

There are a few further assumptions that have to be made when assessing the action probabilities—

If there are certain requisites necessary to perform an action, it is always assumed that they are available when the action is suggested. Thus, it is not necessary to take the availability of requisites into account when assessing the probability that an action will solve the problem. The availability of requisites is handled by allowing the user to skip an action by reporting that he is not able to or does not want to perform it.

When an action involves replacing a suspected component with another, there is a slight chance that the new component is faulty and causes the same problem. Even though this probability is often negligible, it is necessary to take it into account when assessing the probability that an action solves the problem. If the replacement component is faulty and causes the same problem, the user will input to the diagnostic system that the action didn't help. The system should then not rule out completely the causes that the action can solve, as the replacement component could have been faulty.

As discussed above, there is a distinction made between solution actions and information-gathering actions. Even though information-gathering actions cannot solve the problem, the probabilities are gathered in almost exactly the same way. In practice, even though information-gathering actions cannot solve the problem, they conduct an experiment on the system to see whether the problem goes away when the configuration is changed. The first probability elicitation question above should then be asked slightly differently: assuming that $C_i$ is the only cause of the problem in question, what is the probability that correctly performing the action makes the problem go away in the new configuration?

For the "light print" problem, the probabilities of actions look as is set out in Table 11 below. After each action, the associated causes and the probability that the action will solve them are listed. The inaccuracy factors are discussed later.

TABLE 11

| Action | Cause:Probability |
|---|---|
| A) Ensure that media is within specifications (SA) | 1:100 |
| B) Try another toner cartridge that is within specification (IA) | 4:100 |
| C) Remove, shake and reinsert toner cartridge (SA) | 4b:100, 4c:60 |
| D) Reseat transfer roller (SA) | 5b:100, 11a:100 |
| E) Try different media (IA) | 1:90 |
| F) Perform printer maintenance kit (SA) | 2:100, 5:100, 11a:100 |
| G) Power cycle the printer (SA) | 11a:100 |
| H) Ensure that environmental conditions are within specifications (SA) | 3:100 |
| I) Clean the inside of the printer according to the user manual (SA) | 2:100, 4b:100, 11a:100 |
| J) Try another in-spec transfer roller (IA) | 5:100, 11a:100 |
| K) Ensure economode/draft mode is not on in the application (SA) | 6a:100 |
| L) Ensure 300 dpi is not set in the application (SA) | 6b:100 |
| M) Examine and correct other application settings related to "light print" (SA) | 6c:100 |
| N) Ensure economode is not on in the printer driver (SA) | 7a:100 |
| O) Ensure 300 dpi is not set in the printer driver (SA) | 7b:100 |
| P) Examine and correct other printer driver settings related to "light print" (SA) | 7c:100 |

TABLE 11-continued

| Action | Cause:Probability |
|---|---|
| Q) Ensure economode/draft more is not on the control panel of the printer (SA) | 8a:100 |
| R) Ensure 300 dpi is not set on the control panel of the printer (SA) | 8b:100 |
| S) Ensure print density is not set too low on the control panel (SA) | 8d:100 |
| T) Diagnose the dataflow (SA) | 9:100 |
| U) Ensure that an in-spec up-to-date printer driver is used (SA) | 13:100 |

In a step 909, costs of actions and questions are estimated.

In the diagnostic algorithms, it is necessary to know the cost of performing actions and questions to be able to determine which is the optimal step to perform next. The cost can either be estimated as a single factor, or as a combination of multiple factors. As the cost really is composed of multiple significant factors, it seems to be the most reliable and accurate approach to assess each of these factors separately, and then combine the factors into a single cost factor. The cost is composed of many factors. Four which seem to be the most significant are described below.

The first factor is time: the time (in minutes) it takes to perform a step. Time that is spent in labor is distinguished from time that is spent waiting, weighing waiting time lower than labor time, implying that a step that takes 10 minutes of mostly waiting is given a lower cost than a step that takes 10 minutes in constant labor. When estimating the time, it is averaged over the user population. There are experienced users that can perform certain steps faster than others, but the final time-estimate will have to be averaged over all types of users.

The second factor is risk: the risk (very low, low, medium, high or very high) of breaking or destroying something else when performing the step. The risk is very relevant when suggesting steps as it is desirable to suggest the steps with the lowest risk of breaking something before steps with higher risk. Again, the risk must be averaged over the user population where there are both experienced users with low risk of breaking something, and novice users with higher risk.

The third factor is money: the amount of money (very low, low, medium, high or very high) required to purchase the requisites of a step. There are steps where there is a high likelihood that users do not have all the required requisites and may have to purchase them—and these steps should receive a higher cost than similar steps with no requisites. Again, the amount of money required for a step must be averaged over the user population. Depending on the user type, some users may have the necessary requisites, while others may have to purchase them.

The fourth factor is insult: the degree of insult the user experiences when the step is suggested (very low, low, medium, high or very high). If an experienced user is suggested a novice step (e.g., check whether the printer is plugged in), he may feel insulted. Therefore, such a step is given a slightly higher cost to allow less insulting steps to be suggested earlier in the sequence.

There are several other factors of cost that can be considered such as the inconvenience in performing a step, however, experience has proven a real need only for the above four. The inconvenience of a step is taken into account partly by the time and risk (if it is inconvenient, it is likely to take a longer time and be more risky), but also by the ability to skip a step.

The cost factors must be combined into a single figure to be useful for the diagnostic algorithms. To do this, the risk, money and insult factors must be converted to numbers, and finally the four factors must be balanced and added. To determine how to do this, many experiments must be performed with the domain experts asking them to rank steps which differ on cost factors. From a sufficient amount of such experiments, the conversion factors and weights can be determined. One such experiment could for instance be:

Of two actions with equal probability of solving the problem, which do you want to suggest first?

$A_1$ with time=20, risk=medium $A_2$ with time=10, risk=high

For the printing system domain, the conversion of the risk factor to a number comparable with time is as set out in Table 12 below:

TABLE 12

| very low | 0 |
|---|---|
| low | 1 |
| medium | 2 |
| high | 4 |
| very high | 8 |

The resulting number is multiplied with 9, i.e., a 0 minute step with very high risk is equal to a 72 (8×9) minute step with very low risk.

The conversion of the money factor to a number comparable with time is as set out in Table 13 below:

TABLE 13

| very low | 0 |
|---|---|
| low | 1 |
| medium | 3 |
| high | 10 |
| very high | 30 |

The resulting number in Table 13 is multiplied with 10, i.e., a 0 minute step with a money factor of very high is equal to a 300 (30×10) minute step with a money factor of very low.

The insult factor was only used in rare occasions in the printing system project, thus a full conversion was not defined. When an insult factor of low was specified, this was converted to 10.

For the "light print" problem, the inaccuracy and cost factors are as set out in Table 14 below (in the order, inaccuracy, time, risk, money and insult):

TABLE 14

| Diagnostic Steps | I | T | R | M | I |
|---|---|---|---|---|---|
| A) Ensure that media is within specifications (SA) | VH | 15 | 0 | 0 | 0 |
| B) Try another toner cartridge that is within specification (IA) | L | 7 | L | 0 | 0 |
| C) Remove, shake and reinsert toner cartridge (SA) | 0 | 2 | 0 | 0 | 0 |
| D) Reseat transfer roller (SA) | M | 4 | L | 0 | 0 |
| E) Try different media (IA) | L | 8 | 0 | 0 | 0 |
| F) Perform printer maintenance kit (SA) | M | 25 | H | 0 | 0 |
| G) Power cycle the printer (SA) | 0 | 1 | 0 | 0 | 0 |
| H) Ensure that environmental conditions are within specifications (SA) | VH | 120 | 0 | 0 | 0 |

TABLE 14-continued

| Diagnostic Steps | I | T | R | M | I |
|---|---|---|---|---|---|
| I) Clean the inside of the printer according to the user manual (SA) | L | 7 | L | 0 | 0 |
| J) Try another in-spec transfer roller (IA) | L | 10 | M | 0 | 0 |
| K) Ensure economode/draft more is not on in the application (SA) | L | 2 | 0 | 0 | 0 |
| L) Ensure 300 dpi is not set in the application (SA) | L | 2 | 0 | 0 | 0 |
| M) Examine and correct other application settings related to "light print" (SA) | L | 5 | 0 | 0 | 0 |
| N) Ensure economode is not on in the printer driver (SA) | 0 | 1 | 0 | 0 | 0 |
| O) Ensure 300 dpi is not set in the printer driver (SA) | 0 | 1 | 0 | 0 | 0 |
| P) Examine and correct other printer driver settings related to "light print" (SA) | L | 5 | 0 | 0 | 0 |
| Q) Ensure economode I draft more is not on on the control panel of the printer (SA) | L | 2 | 0 | 0 | 0 |
| R) Ensure 300 dpi is not set on the control panel of the printer (SA) | L | 2 | 0 | 0 | 0 |
| S) Ensure print density is not set too low on the control panel (SA) | L | 2 | 0 | 0 | 0 |
| T) Diagnose the dataflow (SA) | VH | 75 | VH | 0 | 0 |
| U) Ensure that an in-spec up-to-date printer driver is used (SA) | L | 15 | L | 0 | 0 |
| V) Is the printer maintenance kit due? (Q) | 0 | 1 | 0 | 0 | 0 |
| W) Is the toner cartridge from a supported manufacturer? (Q) | 0 | 1 | 0 | 0 | 0 |
| X) Does the control panel say "Toner low"? (Q) | 0 | 1 | 0 | 0 | 0 |
| Y) Is the printer configuration page printed light? (Q) | 0 | 4 | 0 | 0 | 0 |

In a step 910, actions and questions requiring special handling are identified and dealt with.

There are several pieces of additional information that it is necessary to specify for the diagnostic model to get a diagnostic system that performs as desired. These are collectively referred to as actions and questions requiring special handling.

One of these is initial steps. For some problems, there are default causes that should be ruled out initially, as it is insulting for the customer to start investigating these at a later point. For instance, with the errorcode "tray 2 lifting", it is possible that the user simply didn't wait a sufficient amount of time for the tray to lift, as it can take a while. It is therefore a benefit to ask first whether the user waited long enough, and if not, tell him to. There is no reason to include these steps in the ordinary selection of diagnostic steps, as they should always be forced first. The domain experts should identify steps of this type, and mark them as such.

Another piece of information to specify is workarounds. Actions can be classified as workarounds which signify that they may solve the problem, but the solution may not be satisfactory, e.g., solving a problem with insufficient memory by printing smaller jobs. If an action is classified as a workaround, the user will be prompted whether he is satisfied with the solution, if the workaround helps.

Another piece of information to specify is replacing components. If an action replaces a component with another, it is important to register this, as then the automated diagnostic system will be able to handle situations where the component was improperly seated. If replacing a component with another works, it might have been because the component was improperly seated in the first place, so the diagnostic system should prompt the user to try reinserting the old component once again to verify this.

Another piece of information to specify is irreversible actions. If an action solves the problem, but the cause has not been fully identified, the user is asked whether he wants to continue diagnostic. If he agrees to continue, he will have to reverse the last action so that the problem reappears. If the last action performed is irreversible (e.g., reboot PC, power cycle printer), this is not possible. In that situation, the user should not be asked whether he wants to continue diagnostic, as this is not possible. Therefore, the domain experts should register actions that are irreversible.

Another piece of information to specify is included actions. Actions may include other actions. For example, it is common that actions include power cycling the printer, so, if such an action has been performed it should not be later suggested to the diagnostician to power cycle the printer again. Therefore, the domain experts should register if an action includes other actions.

Another piece of information to specify is special-case steps. There are steps that should only be suggested in special cases, for example, after a specific question has been answered with a specific answer, or only if a specific question has not been answered with a specific answer. For instance, in the printing system domain there are special manufacturer-specific actions that should only be suggested when the manufacturer of a component has been verified.

Another piece of information to specify is persistence. Persistence refers to the problem of old observations being rendered invalid by later performed actions. There are often situations with a question Q and an action A, where Q requests the status of some property of the system, and if the status is not the desired one, action A will be suggested to fix this. Diagnostic cannot be continued with the observation that Q is in the non-desired state. The state of Q is modified to ensure that the diagnostic system operates on valid information. This situation can be handled by having the domain experts register situations where there are question-action pairs Q and A, such that performing A fixes Q in a specific state. The diagnostic system then knows to automatically fix Q in this state, if A is performed, indifferent to what Q was previously observed as. Obviously this is still an approximate solution, as it is not integrated in the computation of expected cost of repair (ECR).

The authoring tool described below allows experts in a domain (e.g., printing systems, network systems, etc.) to easily enter knowledge of the domain. From this knowledge is created an automated diagnostic system that can help novice/non-expert users to diagnose problems in the modeled domain.

The authoring tool utilizes principles of object-orientation by arranging the information in modules corresponding with physical components in the domain. By reusing these modules in multiple diagnostic systems, benefits such as decreased time requirements, increased consistency and decreased maintenance time can be obtained.

The authoring tool essentially implements the knowledge acquisition process described above.

Herein, the user of the authoring tool is called the author. Users of diagnostic systems created with the authoring tool are called diagnosticians or sometimes just users. The problem domain that is being modeled in the authoring tool is also denoted the device or system in question. The internal representation of the diagnostic system in the authoring tool is denoted the model or the diagnostic system specification (DSS).

The authoring tool is used to create a set of diagnostic systems in a single domain. For this domain it can be assumed that there is a large amount of overlapping such that many modules can be reused. For instance, in the printer domain, the fuser component is a cause in many error conditions such as spots, poor fusing, etc. For each error condition in the domain, a complete diagnostic model is used. It is assumed that the diagnostician will be able to identify exactly the error condition that he is experiencing and thus the associated diagnostic system can be selected.

A library of modules is built up in the authoring tool. As this library grows and more modules are added, it will be easier to create new diagnostic models.

The usual way to use the authoring tool is to first create a few diagnostic models. From these, the first modules in the library are created for later reuse. When more and more diagnostic models are added, more and more modules can be created, and the existing modules can be refined and enlarged.

Figure 5:
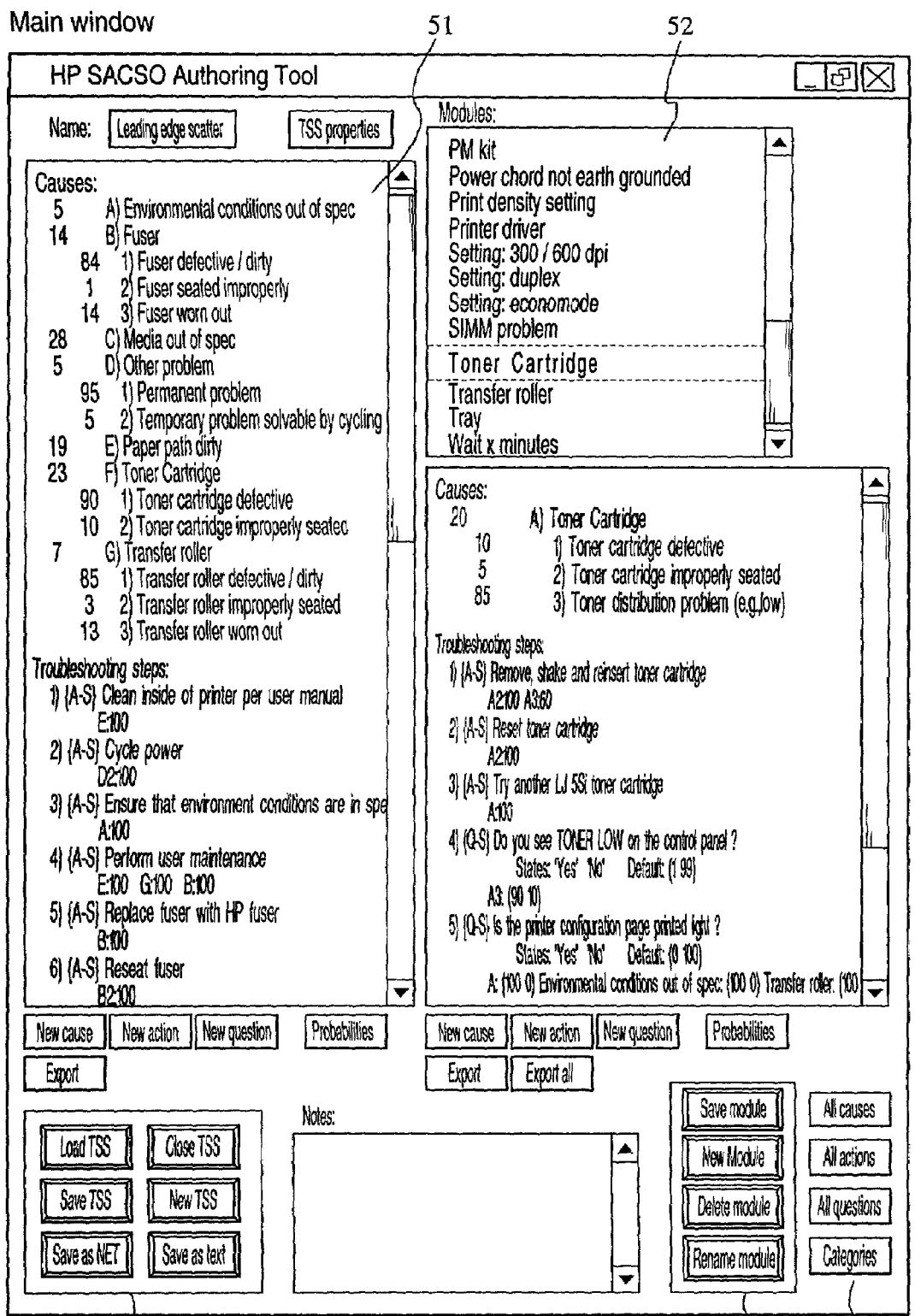
FIG. 5 shows a main interface for an authoring tool in accordance with a preferred embodiment of the present invention.

FIG. 5 shows a main interface 50 for the authoring tool. Main interface 50 is spit into two sides. A side 51 functions as a diagnostic model editor and is used for editing diagnostic models. A side 52 includes a list of library modules and a library module editor. The library module editor is used for editing library modules. The diagnostic model editor and the library module editor have almost the same functionality. Both allow the creation of new causes, actions and questions, the editing of existing causes, actions and questions, the editing of probabilities of all these, and the exporting and importing of elements from the other editor.

In an area 53, the diagnostic model editor of main interface 50 further allows loading a new diagnostic specification (DSS), closing the current DSS, starting a new DSS, and saving the DSS in various formats described later. In an area 54, the library module editor of main interface 50 further allows saving of a module, creation of a new module, deletion of a module, renaming a module, overviews of all causes, actions and questions for quick searching, and the specification of categories of causes as will be further described below.

The building blocks of the authoring tool are the library modules, also called modules. The modules correspond to physical components in the domain under consideration, or areas of information that is closely related such as software. In the preferred embodiment, modules are arranged such that all the causes in the module are resolved if the physical component corresponding with the module is replaced with a functioning one. When modules are arranged in this manner, optimal reuse is possible, i.e., for error conditions involving the module usually all the causes in the module can be used. For some error conditions, though, there may be causes in the module that have to be removed as they are not related with the error.

Modules are created from scratch in the authoring tool by creating a series of new causes, and actions and questions relating to these causes. Alternatively, modules are created by importing pieces of finished diagnostic models.

All the modules are contained in the library. There is one library for each domain under consideration, e.g., printing systems, cars, etc.

When a module is changed, the change is propagated to all the error conditions in which the module has been used.

A new diagnostic model is created by first combining the modules that correspond with those physical components or logical areas that are deemed to have an effect on the error condition. Some causes and diagnostic steps in these modules may be unrelated and have to be removed. When the construction of the model is finished, the authoring tool outputs it as a Bayesian network (with some additional information). The building blocks of modules, causes, actions and questions are all created such that they can be combined randomly on the fly, and it is guaranteed that the result will be a correct Bayesian network. The construction of this Bayesian network is documented in co-pending patent application Ser. No. 09/353,727, filed on Jul. 14, 1999 for AUTOMATED DIAGNOSIS OF PRINTER SYSTEMS USING BAYESIAN NETWORKS, the subject matter of which is herein incorporated by reference.

In the authoring tool information pertaining to diagnostic models can be specified. Particularly, the following can be specified:

Name: the name of the error condition represented with the diagnostic model.

Explanation: an explanation of what exactly the error condition is, including some information of how it occurs.

Problem observation time: the time that it takes to test whether the problem has disappeared. This test must be performed after every diagnostic step so it is important to know how much time it takes.

A cause represents some event or property that if it occurs causes the error condition with absolute certainty. In the knowledge acquisition process, the probabilities of causes are elicited from domain experts. The authoring tool handles this elicitation process without requiring a Bayesian network expert present.

Figure 6:
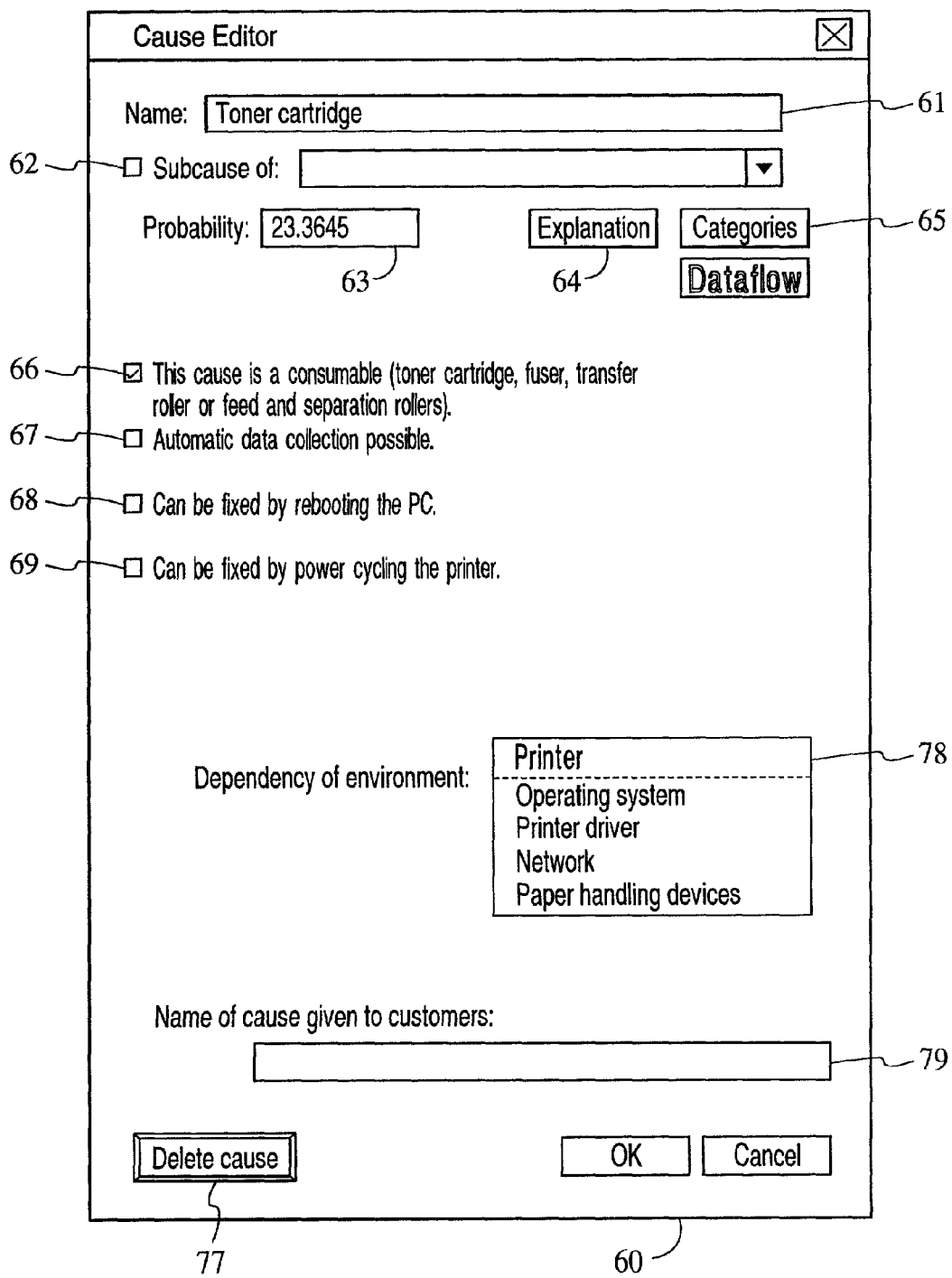
FIG. 6 shows an interface for a cause editor in accordance with a preferred embodiment of the present invention.

From main interface 50 for the authoring tool it is possible to create a new cause and edit an existing cause. Creating a new cause or editing an old cause results in opening up a cause editor interface 60, shown in FIG. 6. A name box 61 allows an author to edit the name of the cause. A subcause checkbox 62 specifies whether the cause is a subcause of another cause. For eased elicitation of probabilities, causes are arranged in a tree with the problem itself at the root, then causes, subcauses of these, etc.

A probability box 63 allows an author to edit the probability of the cause. The probability of the cause can also be specified with the cause probability editor described below.

Figure 16:
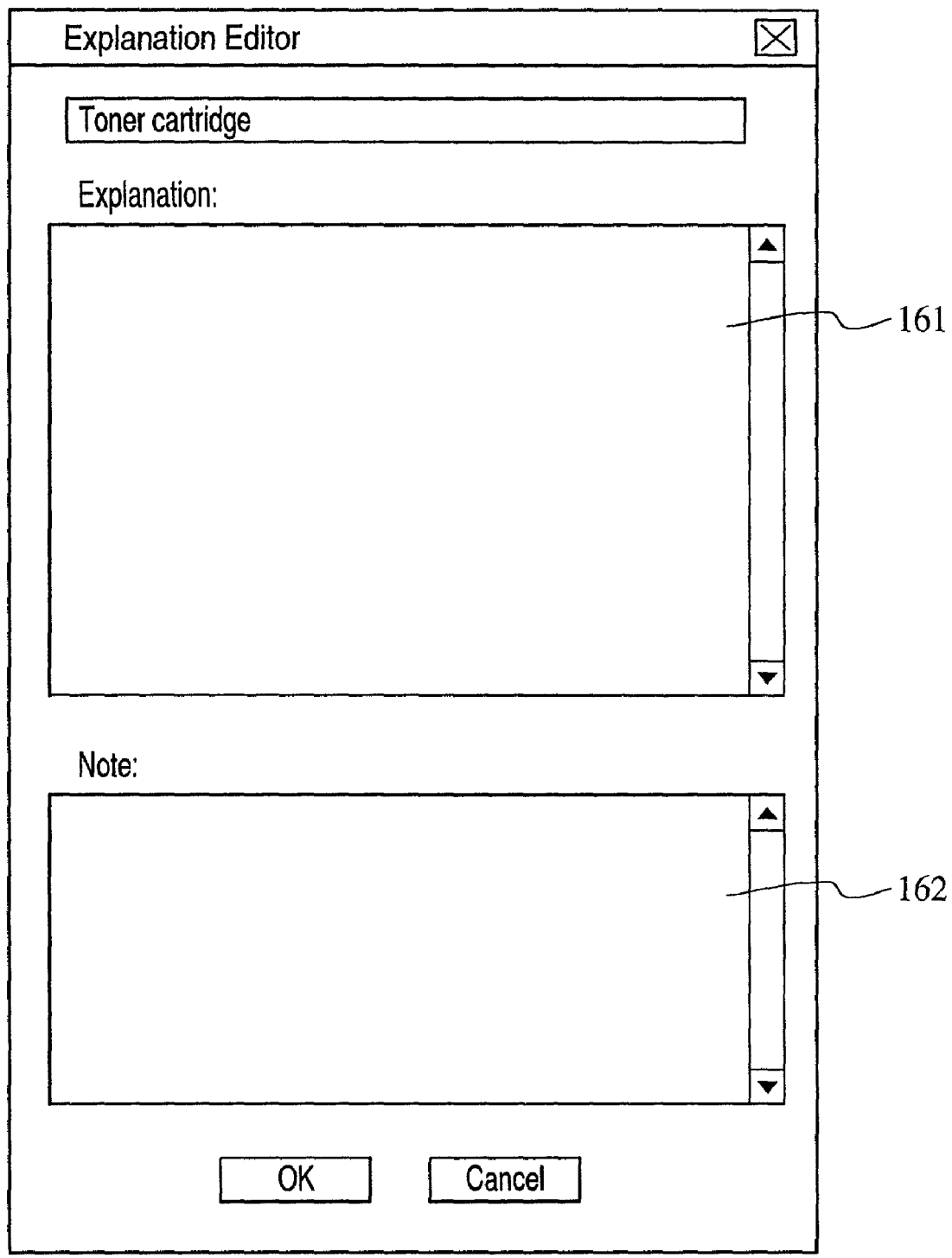
FIG. 16 shows an interface for an extra information editor in accordance with a preferred embodiment of the present invention.

Selecting an explanation button 64 brings up an explanation editor interface 160, shown in FIG. 16. In an explanation box 161, an explanation of the cause can be given. Often, the name of the cause is not sufficient for a diagnostician to understand the nature of the cause, and in these situations a longer explanation is beneficial. The explanation is written such that it can be presented to a user of the finished diagnostic system. In a box 162, a note giving further information about the cause can be given. This can be used for information relevant to the authors of the diagnostic systems that should not be seen by the users of the finished diagnostic system.

A category button 65 (shown in FIG. 6) is selected when an author desires to specify one or more categories that the cause falls into for later easy lookup of the cause. This process is further described below.

A consumable checkbox 66 allows the author to mark that the cause is a consumable, i.e., a component that customers are responsible for replacing if it wears out. This has a bearing on the ending message of the diagnostic system. If it is determined that the most likely cause is a worn out or defective consumable, the customer will have to replace it himself. If the likely cause is a non-consumable component, the customer will have to call for further assistance.

An automatic data collection checkbox 67 allows the author to mark that conclusive information about the cause can potentially be obtained by directly querying the device in question. Automatic data collection is usually much more efficient than getting the information from the user of the diagnostic system.

A fix by rebooting PC checkbox 68 allows the author to mark that this cause can be fixed by rebooting the personal computer (PC). This information is relevant in the diagnostic system to determine which causes are no longer valid when rebooting the PC does not succeed in solving the problem.

A fix by power cycling printer checkbox 69 allows the author to mark that this cause can be fixed by power cycling the printer.

A dependency on environment box 78 allows an author to specify dependencies of the cause on the version or model of components in the system. This is aimed at easing migration, as is discussed further below.

A customer-suited name box 79 allows the author to specify the name of the cause that is shown to users of the diagnostic tool. This can be relevant in situations where the name of the cause is not suitable for customers.

A delete cause button 77 allows the author to delete the cause from the diagnostic model.

Probabilities of causes can be elicited in two ways. As described above, probabilities of causes can be specified one at a time by using the cause editor interface 60.

Figure 7:
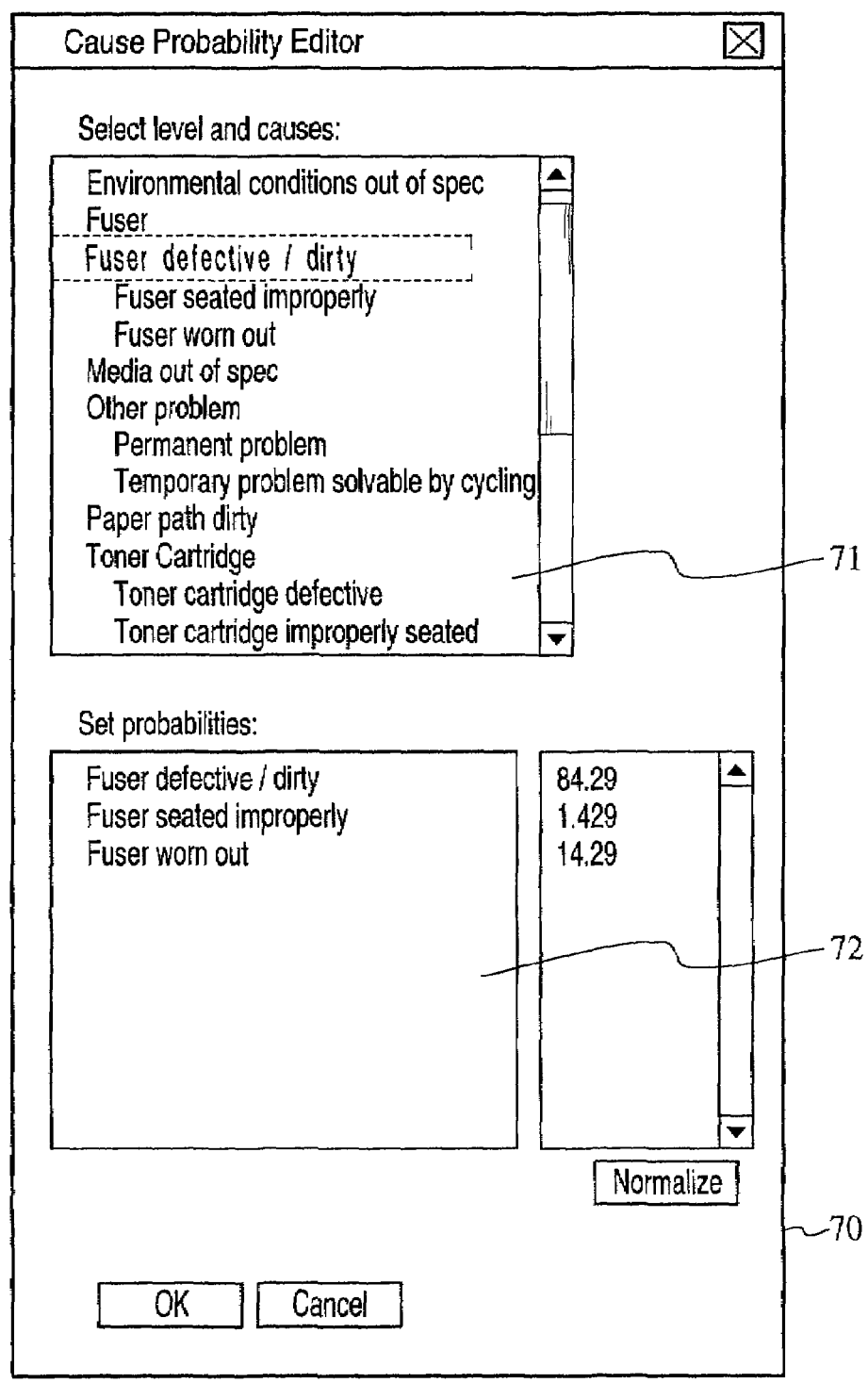
FIG. 7 shows an interface for a cause probability editor in accordance with a preferred embodiment of the present invention.

Probabilities of causes can also be specified more efficiently by using a cause probability editor interface 70 shown in FIG. 7. In a box 71, the author is given a view of the causes structured as a tree. After an author double-clicks on a cause, in box 71 all the causes on the same level and with the same parent as this cause, and their associated probabilities are shown in a box 72. The author can then assign probabilities to these causes given their parent cause (in the case of top level causes, given the problem). The probabilities are assigned such that they sum to 100%, and they can be normalized when needed. In the preferred embodiment, cause probability editor interface 70 (as well as all other editor interfaces in the authoring tool) work with percentages instead of probabilities, as domain experts often prefer working with these.

In cause editor interface 60, the author has the ability to specify that the cause falls into one or more categories. Categories correspond with logical areas or properties in the system that is being modeled that are not mirrored in the structure of the modules. Modules are usually structured corresponding with physical components or logical areas, however, there can be other ways to group causes and these can be captured with categories.

Figure 8:
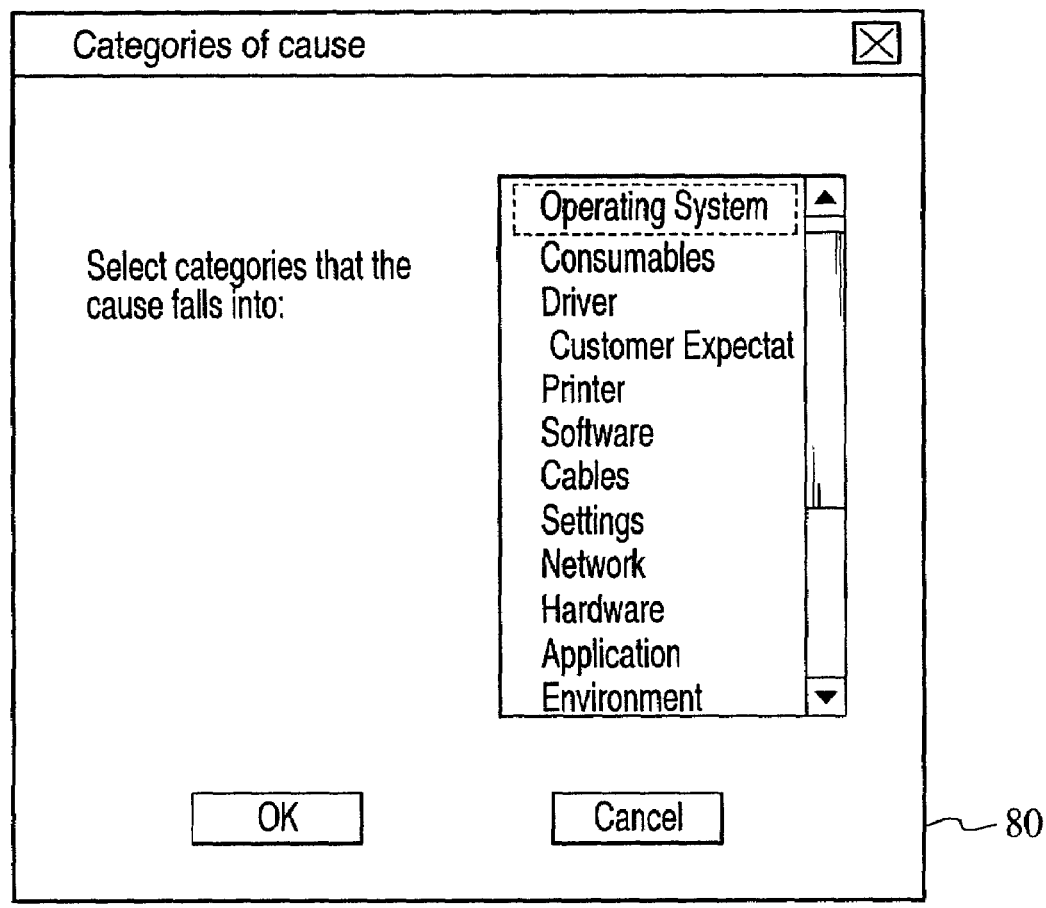
FIG. 8 shows an interface for a cause category editor in accordance with a preferred embodiment of the present invention.

A category editor interface 80, shown in FIG. 8, is used to create new categories or delete existing ones. Examples of categories in the printing system domain are software, cables, network, hardware, accessories, and settings. Categories should not only be created if there exists an error condition where all the causes within the category are relevant. Categories are also created to ease lookup of causes.

In a preferred embodiment of the present invention, a window presents a list of all causes in the library modules. This window allows setting one or more categories, and the causes that fall in all the specified categories are shown. With this facility, finding causes becomes much faster.

An action is a step that the diagnostician can perform that has a chance of either solving the problem or temporarily removing the problem. Solution actions have the potential to solve the problem such that no further action is required, and information-gathering actions have the potential to remove the problem (though not solving it) by performing some test on the system. It is important to distinguish between the two types of actions (actions that can solve any of the causes of the problem, and actions that can provide information regarding the causes). Solution actions and information-gathering actions are handled differently for selecting the best next step. In the preferred embodiment, information-gathering actions are treated in the same way as questions.

Main interface 50 (shown in FIG. 5) for the authoring tool allows the creation of new actions and the editing of existing actions by double-clicking the actions as they are displayed in side 51 or side 52. Both these actions open up an action editor interface 90 shown in FIG. 9.

Action editor interface 90 allows the specification of all knowledge pertaining to the action relevant for the diagnostic process. The probabilities of the action can also be set with the special action probability editor interface described below.

In a box 91, the name of the action is specified. In a box 92, the type of the action is specified, i.e., whether the action is a solution or an information-gathering actions.

In a checkbox 93, an author can specify whether the action is forced in sequence. This is sometimes relevant for actions that should always be performed before starting the real diagnostic, for example, for ensuring some initial belief about the environment. The author can specify that the action should be forced as one of the first actions, and give it a number in this forced sequence.

In a workaround checkbox 94, an author can specify whether the action is a workaround. The workaround presents a solution to the problem that may not be satisfactory in the long run to the diagnostician, so he will be asked whether he is satisfied with the solution in the diagnostic system for these actions.

Selecting an explanation button 95 brings up explanation editor interface 160, shown in FIG. 16. In explanation box 161, an explanation of the action can be given. Often, the name of the action is not sufficient for a diagnostician to understand the nature of the action, and in these situations a longer explanation is beneficial. The explanation is written such that it can be presented to a user of the finished diagnostic system. In box 162, a note giving further information about the action can be given. This can be used for information relevant to the authors of the diagnostic systems that should not be seen by the users of the finished diagnostic system.

Figure 15:
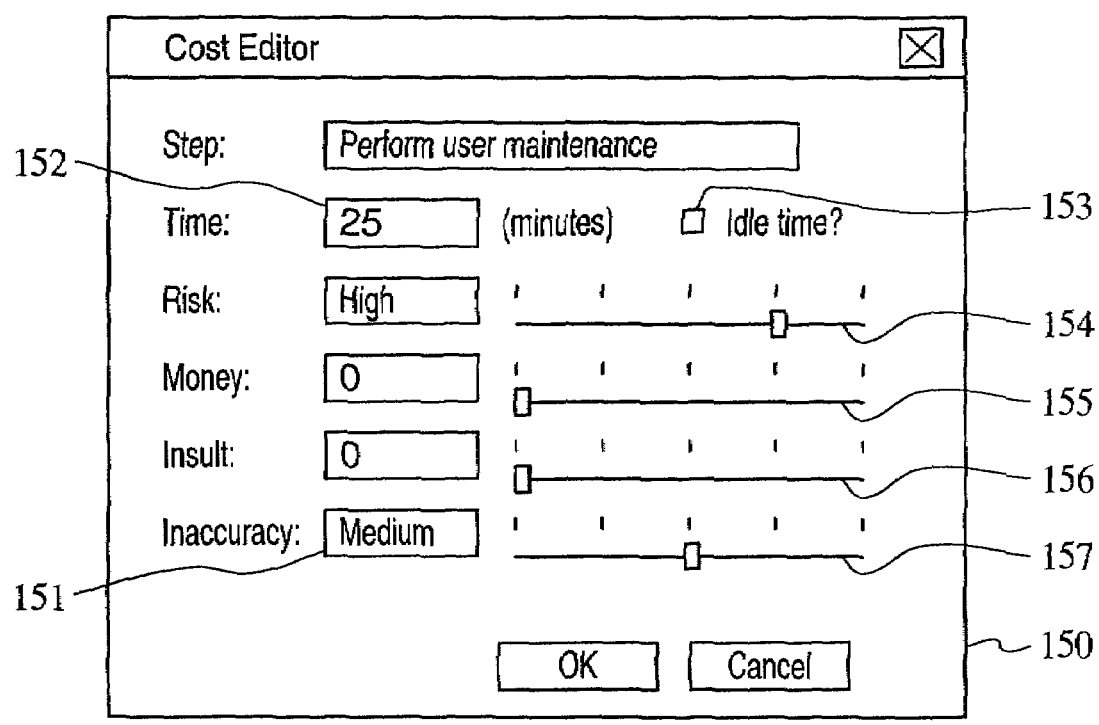
FIG. 15 shows an interface for a cost editor in accordance with a preferred embodiment of the present invention.

An edit costs button 96 opens up a cost editor interface 150 shown in FIG. 15. Cost editor interface 150 is used for both actions and questions. In a box 151 of cost editor interface 150 an author can specify an inaccuracy factor. The inaccuracy factor is the likelihood that the diagnostician performs the action incorrectly without realizing it.

Using cost editor interface 150, an author can also specify four cost components: time, risk (of breaking something else when doing the step), money, and insult (for steps that may be insulting to experienced diagnosticians).

In a box 152, time is specified as a number measured in minutes. A checkbox 153 is used for specifying whether the time is spent waiting or in active labor. This also is used in the computation of total cost. The inaccuracy factor is specified using a slider 157 on a scale of five values (very low, low, medium, high and very high). The risk factor is specified using a slider 154 on a scale of five values. The money factor is specified using a slider 155 on a scale of five values. The insult factor is specified using a slider 156 on a scale of five values.

Figure 9:
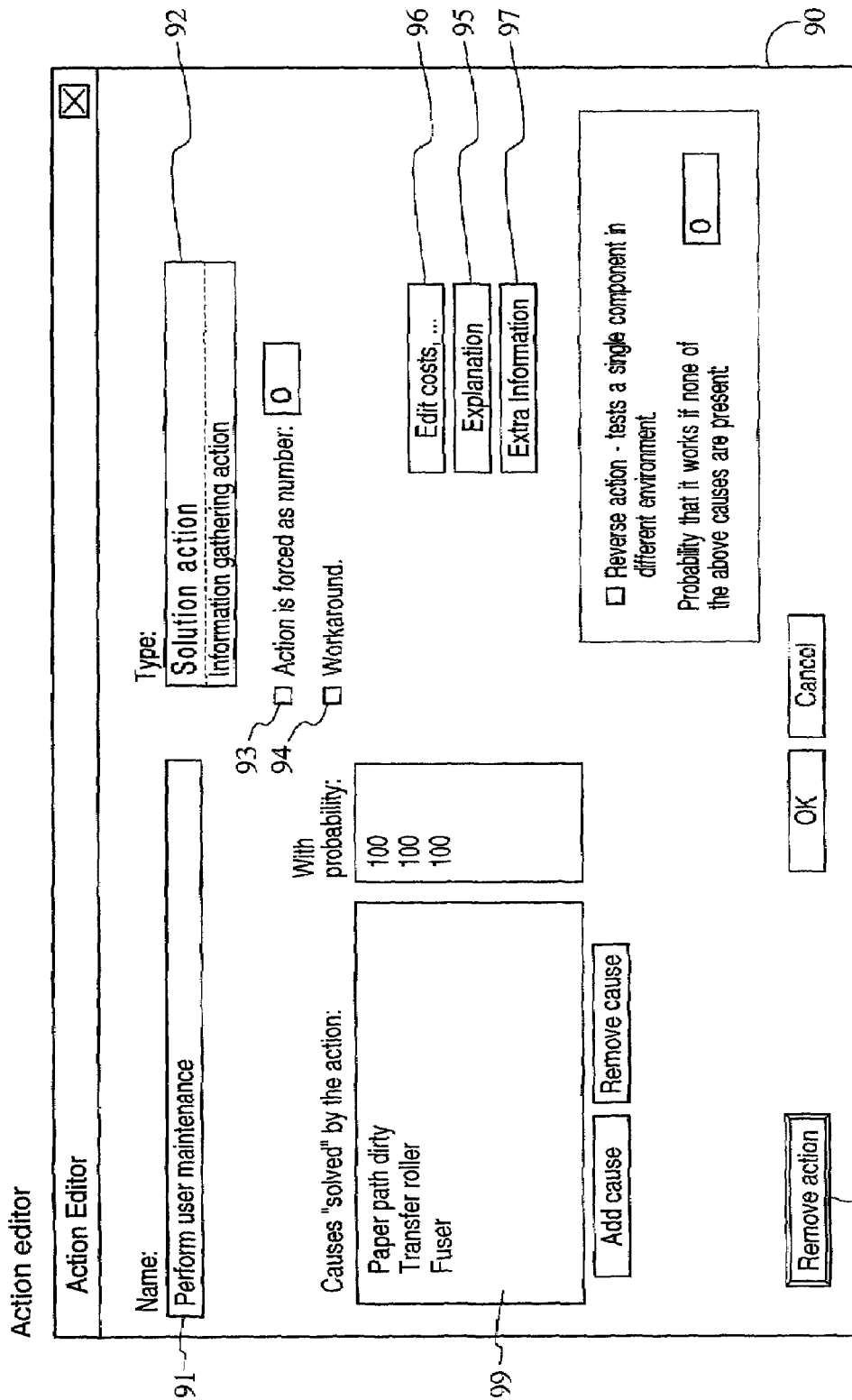
FIG. 9 shows an interface for an action editor in accordance with a preferred embodiment of the present invention.
Figure 10:
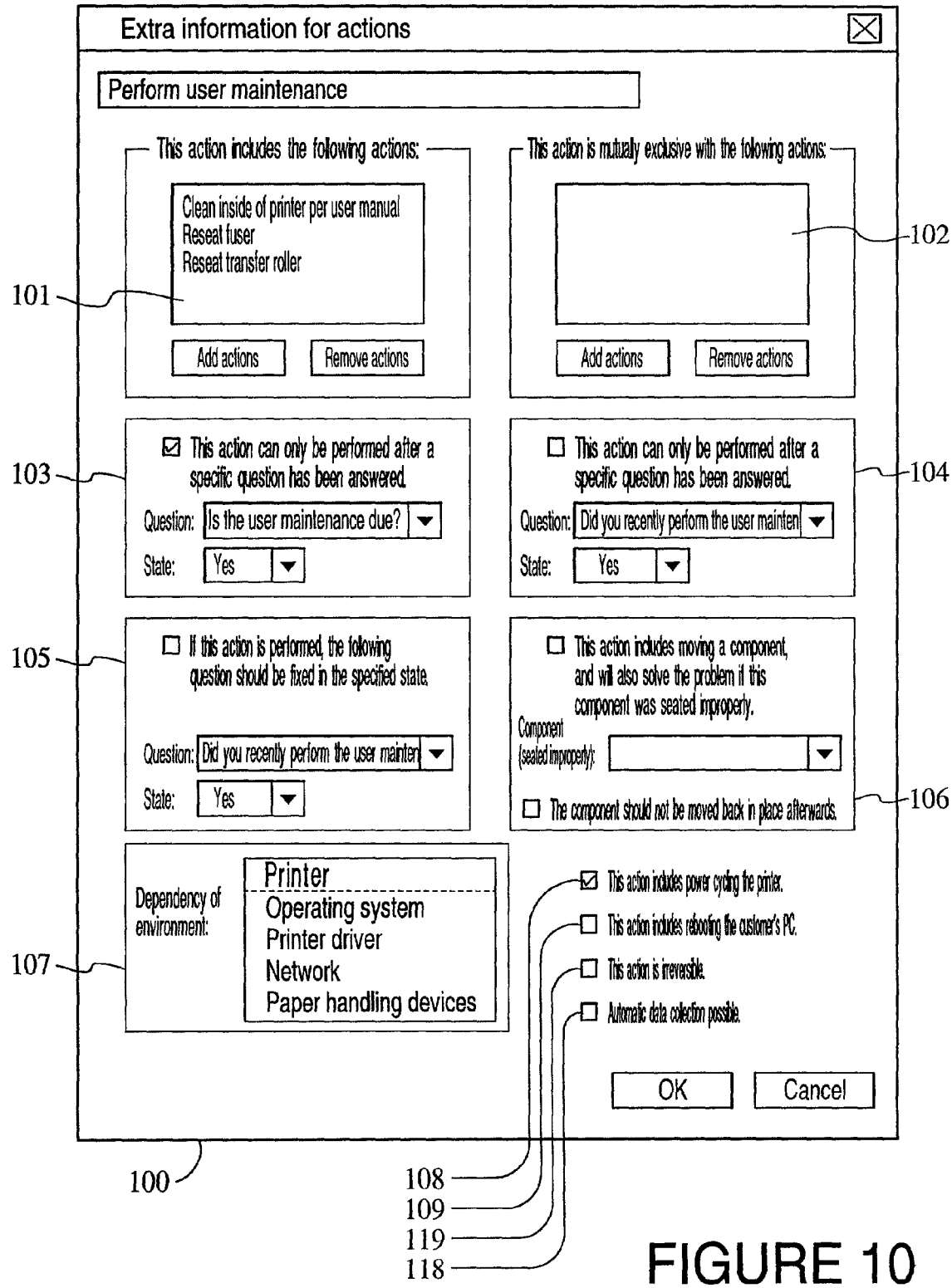
FIG. 10 shows an interface for an action probability editor in accordance with a preferred embodiment of the present invention.

In action editor interface 90 shown in FIG. 9, selecting an extra information button 97 brings up an extra information editor 100, shown in FIG. 10. An included actions window 101 allows the specification of all actions that are included in current action, i.e., actions that also performed when this action is performed. This is highly relevant to the diagnostic system as the diagnostic system knows not to suggest an action that has already been performed as part of other actions.

A mutually exclusive actions window 102 allows the specification of actions that are mutually exclusive with the current action. For example, if action A is specified as mutually exclusive with action B, then action A can not be suggested after action B, and vice versa.

In an area 103 the author can specify that the action can only be suggested after a specific question has been answered with a specific answer. This is relevant for ensuring that prerequisites are available and/or fulfilled before suggesting actions. The question along with the answer can be specified. It is possible to specify "Any" as the required answer which implies that the question has to be asked before the action can be suggested, however, the answer does not matter.

In an area 104 the author can specify that the action can not be suggested after a specific question has been answered with a specific answer. Again, it is possible to specify "Any" as an answer.

In an area 105, the author can specify a question that will be fixed in a specific state (answer) if the action has been performed. This can be used to avoid incoherent information in the underlying Bayesian network. For example, if the diagnostic system suggests question "Is the printer turned on?" and receives the answer "no", then the next logical step is to suggest action "turn the printer on", after which the answer to the first question is no longer valid. This can be handled by specifying here that the question "Is the printer turned on?" must be fixed in state "yes" after the action has been performed.

In an area 106 the author can specify whether the action includes moving a specific component. If this is the case, the action will potentially solve the cause of this component being seated improperly. It is important that this is specified as the diagnostic system than knows to ask the diagnostician to try putting the component back again if the action helped, to see whether it was because the component was improperly seated.

A dependency on environment box 107 allows an author to specify dependencies of the cause on the version or model of components in the system. This is aimed at easing migration, as is discussed further below.

A checkbox 108 is used by an author to specify whether the action power cycles the printer. Combined with the knowledge of the causes that are solved by power cycling the printer, this allows the diagnostic system to correctly treat these actions and causes.

A checkbox 109 allows an author to specify whether the action includes rebooting the personal computer.

A checkbox 119 is used to specify if the action is irreversible. If an irreversible action solves the problem, the diagnostic system will not ask the diagnostician whether he wants to continue diagnosis as it is impossible to recreate the problem by undoing the action.

An automatic data collection checkbox 118 allows the author to mark that conclusive information about the action can potentially be obtained by directly querying the device in question. Automatic data collection is usually much more efficient than getting the information from the user of the diagnostic system.

Figure 11:
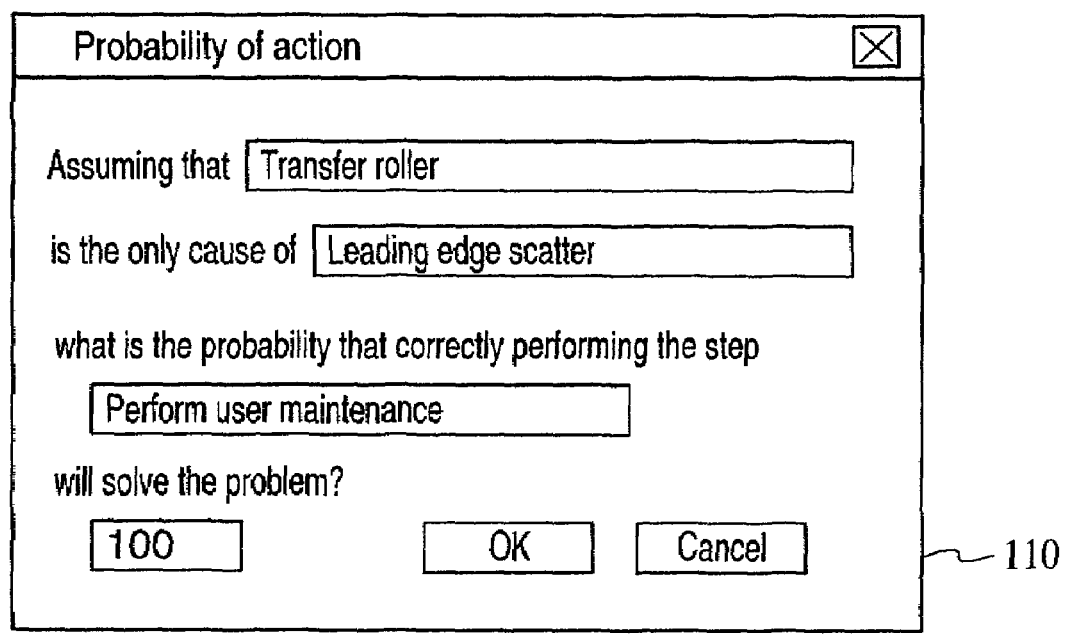
FIG. 11 shows an interface for a general question editor in accordance with a preferred embodiment of the present invention.

In action editor interface 90 shown in FIG. 9, a solved causes window 99 allows the specification of the causes that can be solved by the action, and the probability with which they are solved. It is possible to add a new cause, to edit the probability of an existing, or to remove a cause. Double-clicking a cause displayed in solved causes window 99 brings up an action probability editor 110, shown in FIG. 11. Action probability editor 110 allows the editing of the probability that the action solves the cause. The action probability editor implements the question given to the domain experts to elicit these probabilities: Assuming that <cause> is the only cause of <problem> what is the probability that correctly performing the step <action> will solve the problem?

In action editor interface 90 shown in FIG. 9,selecting a remove action button 98 enables the author to remove the action from the diagnostic model.

In the preferred embodiment, probabilities of actions can also be edited through a global action probability editor that gives an overview of all the actions. The author can select the action that he wants to edit the probabilities for, and he can then choose specific probabilities that he wants to edit or choose to elicit all probabilities of the causes solved by the action one at a time.

A question is a diagnostic step that provides information about the error condition relevant for calculating a sequence of actions with lower expected cost of resolution. There are two types of questions—general questions and symptom questions. General questions gather general information on the error condition that rearranges the probabilities of causes. For these questions, conditional probabilities of causes given questions are elicited. Symptom questions gather information about symptoms of causes, i.e., conditional probabilities of the question given causes are elicited.

From main interface 50 (shown in FIG. 5) for the authoring tool it is possible to create new questions of both types, and editing of existing questions. New questions are created by selecting a new question button from main interface 50. Editing an existing question is accomplished by double-clicking a question displayed in a window within main interface 50. Both these actions open up the corresponding question editor.

Figure 12:
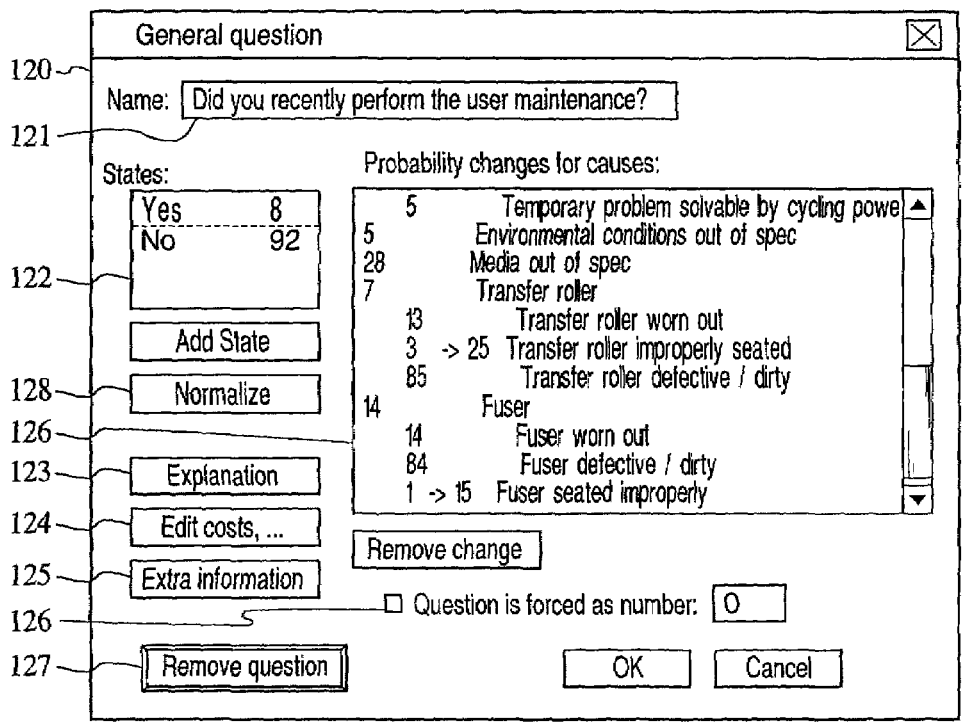
FIG. 12 shows an interface for a probability change editor in accordance with a preferred embodiment of the present invention.

A general question editor interface 120 is shown in FIG. 12. In a box 121 an author can specify the name of the question. In an answers box 122, the author can specify the number of answers and the names of these answers.

Selecting an explanation button 123 brings up explanation editor interface 160, shown in FIG. 16. In explanation box 161, an explanation of the question can be given. Often, the name of the question is not sufficient for a diagnostician to understand the nature of the question, and in these situations a longer explanation is beneficial. The explanation is written such that it can be presented to a user of the finished diagnostic system. In a box 162, a note giving further information about the question can be given. This can be used for information relevant to the authors of the diagnostic systems that should not be seen by the users of the finished diagnostic system.

Selecting an edit costs button 124 opens up cost editor interface 150 shown in FIG. 15. Cost editor interface 150 is used for both actions and questions and is more fully described above.

Selecting an extra information button 125 brings up an extra information editor for questions similar to extra information editor for actions shown in FIG. 10.

The extra information editor for questions includes an "only after question" area in which the author can specify that the question can only be asked after a specific question has been answered with a specific answer. This is relevant for ensuring that prerequisites are available and/or fulfilled before the question is asked. The question along with the answer can be specified. It is possible to specify "Any" as the required answer which implies that the question has to be asked before the new question can be asked, however, the answer does not matter.

The extra information editor for questions includes a "not after question" area in which the author can specify actions or questions that are mutually exclusive with the current question. For example, if question A is specified as mutually exclusive with question B, then question A can not be suggested after question B, and vice versa.

The extra information editor for questions includes a "dependency on environment" area in which the author can specify dependencies of the question on the version or model of components in the system. This is aimed at easing migration, as is discussed further below.

The extra information editor for questions includes an automatic data collection checkbox that allows the author to mark that conclusive information about the question can potentially be obtained by directly querying the device in question. Automatic data collection is usually much more efficient than getting the information from the user of the diagnostic system.

The extra information editor for questions includes an "end diagnosis" checkbox that allows an author to specify that the diagnostic process should end if the question is answered in a certain way.

General question editor interface 120 shown in FIG. 12 also includes a checkbox 126 that allows an author to specify whether the question is forced in sequence. This is sometimes relevant for questions that should always be asked before starting the real diagnosis, for example, for ensuring some initial belief about the environment. The author can specify that the question be forced as one of the first questions, and give it the number in this forced sequence.

A remove question button 127 enables the author to remove the question from the diagnostic model.

The probabilities of answers to the question can also be specified. A button 128 allows normalization of the probabilities.

Given each possible answer to the question, the causes that are affected can be specified in a window 129. For the affected causes, the conditional probability of the cause given each answer to the question must be specified. The probabilities have to be balanced correctly, so not all combinations are allowed. For background information on equations used for balancing question probabilities see co-pending patent application Ser. No. 09/353,727, filed on Jul. 14, 1999 for AUTOMATED DIAGNOSIS OF PRINTER SYSTEMS USING BAYESIAN NETWORKS. Causes can be removed from the list of affected causes.

Figure 13:
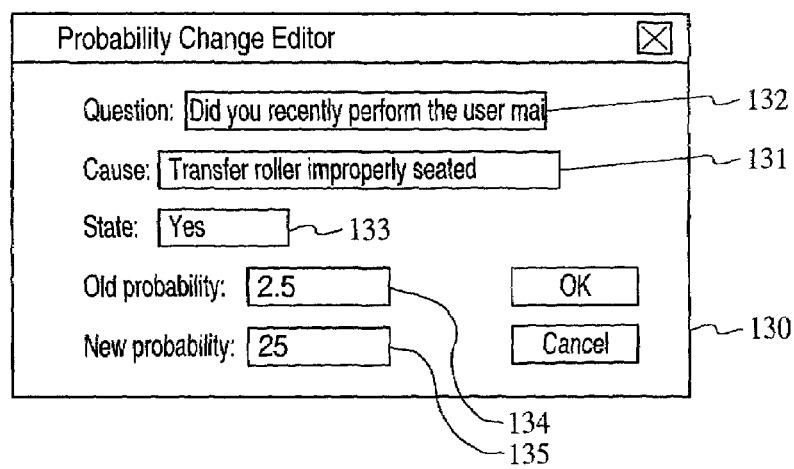
FIG. 13 shows an interface for a symptom question editor in accordance with a preferred embodiment of the present invention.

If one of the probabilities of a cause listed in window 129, is double-clicked, this opens up a change probability editor interface 130, shown in FIG. 13. Change probability editor interface 130 displays the name of the cause in a box 131, the name of the question in a box 132, the state in a box 133, and the old probability in a box 134. A new probability can be entered in a box 135.

Figure 14:
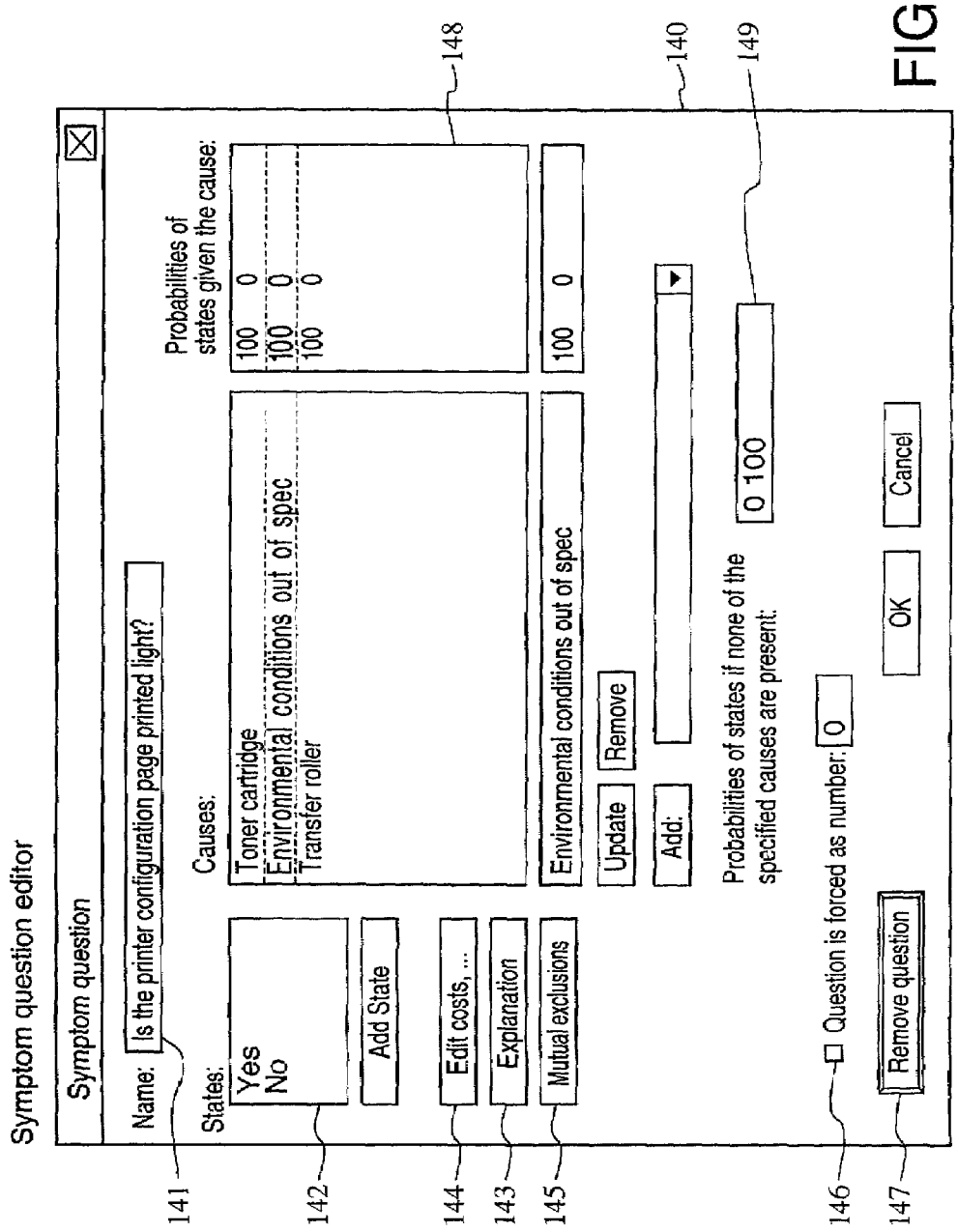
FIG. 14 shows an interface for an explanation editor in accordance with a preferred embodiment of the present invention.

A symptom question editor interface 140 is shown in FIG. 14. In a box 141 an author can specify the name of the question. In a box 142, the author can specify the number of answers (states) and the names of these answers.

Selecting an explanation button 143 brings up explanation editor interface 160, shown in FIG. 16. In explanation box 161, an explanation of the question can be given. Often, the name of the question is not sufficient for a diagnostician to understand the nature of the question, and in these situations a longer explanation is beneficial. The explanation is written such that it can be presented to a user of the finished diagnostic system. In a box 162, a note giving further information about the question can be given. This can be used for information relevant to the authors of the diagnostic systems that should not be seen by the users of the finished diagnostic system.

Selecting an edit costs button 144 opens up cost editor interface 150 shown in FIG. 15. Cost editor interface 150 is used for both actions and questions and is more fully described above.

Selecting a mutual exclusions button 144 allows an author to specify actions or questions that are mutually exclusive with the current question. For example, if question A is specified as mutually exclusive with question B, then question A can not be suggested after question B, and vice versa.

Selecting an extra information button 145 brings up an extra information editor for questions similar to extra information editor for actions shown in FIG. 10.

A checkbox 146 allows an author to specify whether the question is forced in sequence. This is sometimes relevant for questions that should always be asked before starting the real diagnosis, for example, for ensuring some initial belief about the environment. The author can specify that the question be forced as one of the first questions, and give it the number in this forced sequence.

A remove question button 147 enables the author to remove the question from the diagnostic model.

In area 148, causes and probabilities of states (answers) given the cause are shown. Causes that have an effect on the answer to the question can be added to the list of relevant causes or removed from the list. For each of the causes on this list, the conditional probability for each answer to the question is specified given that the cause is the only cause of the problem. For causes that are not on this list, default conditional probabilities for the answers to the question can be specified using box 149. The default conditional probability is the probability of each answer to the question if the real cause is not on the list. Since only one set of default probabilities can be specified, these probabilities should be the same for the causes that are not listed.

The interface editors described above are used to build data structures. The two main data structures are the library data structure and the current diagnostic system model.

The current diagnostic system model has a data structure as set out in Table 15 below:

TABLE 15

| model |
| --- |
| name |
| list of causes |
| list of actions |
| list of questions |
| problem observation time |

The library has a data structure as set out in Table 16 below:

TABLE 16

| library |
| --- |
| list of modules |
| list of categories |

A module has the same structure as a model, as set out in Table 17 below:

TABLE 17

| module |
| --- |
| name |
| list of causes |
| list of actions |
| list of questions |
| problem observation time |

A cause has a data structure as set out in Table 18 below:

TABLE 18

| cause |
| --- |
| name |
| explanation |
| probability |
| parent cause: zero if none exists |
| list of categories |
| consumable: 1 if the cause is a consumable |
| auto collect: 1 if data pertaining to the cause can be automatically collected |
| fix reboot PC: 1 if the cause can be fixed by rebooting the PC |
| fix power cycle printer: 1 if the cause can be fixed by power cycling the printer |
| list of dependencies |
| name customer version: name of cause that is presented to customers |
| not customer use: 1 if the cause is not for customer use/access |
| part name: part name of the cause |

The probability is maintained normalized with the other causes on the same level as the cause itself. If no parent cause is specified, the cause is located on the top level of the cause hierarchy. If a parent cause is specified, the cause is a subcause of this cause.

An action has a data structure as set out in Table 19 below:

TABLE 19

| action |
| --- |
| name |
| explanation |
| type: 0 = solution action/1 = information-gathering action |
| list of (cause, probability) pairs |
| time |
| risk |
| money |
| insult |
| inaccuracy |
| first: 1 if the action should come as one of the first |
| number: if first = 1, this number specifies when the action should come |
| workaround: 1 if the action is a workaround |
| list of included actions |
| only after question: if specified, the action can only be suggested if the question has been answered in $state_1$. |
| $state_1$ |
| not after question: if specified, the action can not be suggested if the question has been answered in $state_2$. |
| $state_2$ |
| not customer use: 1 if the action is not for customer use/access |
| list of actions that are mutually exclusive with this action |
| fix question: if specified, the question is fixed in $state_3$ if the action has been performed |
| $state_3$ |
| move component: 1 if the action includes moving a component |

TABLE 19-continued

| action |
| --- |
| component moved: the component that is moved, if "move component" is 1 |
| move back: 1 if the component should be moved back after the action has been performed |
| power cycles printer: 1 if the action power cycles the printer |
| reboot PC: 1 if the action reboots the PC |
| irreversible |
| auto collect: 1 if data pertaining to the cause can be automatically collected |
| list of dependencies |

The list of cause and probability pairs is the list of the causes that are solved by the action, including the probability that the action solves the problem assuming the cause.

A general question has a data structure as set out in Table 20 below:

TABLE 20

| question |
| --- |
| name |
| explanation |
| number of answers |
| list of names of answers |
| type : 0 = general question/1 = symptom question |
| time |
| risk |
| money |
| insult |
| inaccuracy |
| first |
| number |
| only after question |
| not after question |
| not customer use: 1 if the action is not for customer use/access |
| end question: 1 if diagnosis should end if the question is answered with a specified answer: $state_4$ |
| $state_4$ |
| list of dependencies |
| auto collect: 1 if data pertaining to the cause can be automatically collected |
| list of prior probabilities of answers |
| list of (cause, list of (answer, probability) pairs) pairs |

The list of causes, answers and probabilities contains a probability for each of the causes conditional on each possible answer to the question.

A symptom question has a data structure as set out in Table 21 below:

TABLE 21

| question |
| --- |
| name |
| explanation |
| number of answers |
| list of names of answers |
| type: 0 = general question/1 = symptom question |
| time |
| risk |
| money |
| insult |
| inaccuracy |
| first |
| number |
| only after question |
| not after question |
| not customer use: 1 if the action is not for customer use/access |

TABLE 21-continued question end question: 1 if diagnosis should end if the question is answered with a specified answer: $state_4$
$state_4$
list of dependencies
auto collect: 1 if data pertaining to the cause can be automatically collected
list of (cause, list of (answer, probability) pairs) pairs
list of probabilities of answers given none of the listed causes The list of causes, answers and probabilities contains a probability for each answer to the question conditional on each of the causes.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. An authoring tool that assists an author in building an automated diagnostic system for a product, the authoring tool comprising:
a cause editor interface that allows an author to place, in a cause data structure, information pertaining to causes;
an action editor interface that allows an author to place, in an action data structure, information pertaining to actions that can be taken in response to the causes wherein information pertaining to an action relates to the following:
costs of taking the action, and
trustworthiness of an answer to the action; and
a question editor interface that allows an author to place, in a question data structure, information pertaining to questions that can be asked a user of the product to help identify causes.

2. An authoring tool as in claim 1 wherein information pertaining to the action additionally relates to the following:
an indication as to whether the action should be taken before other actions.

3. An authoring tool that assists an author in building an automated diagnostic system for a product, the authoring tool comprising:
a cause editor interface that allows an author to place, in a cause data structure, information pertaining to causes;
an action editor interface that allows an author to place, in an action data structure, information pertaining to actions that can be taken in response to the causes; and
a question editor interface that allows an author to place, in a question data structure, information pertaining to questions that can be asked a user of the product to help identify causes wherein information pertaining to a question relates to the following:
costs of finding an answer to the question; and
trustworthiness of an answer to the question.

4. An authoring tool as in claim 3 wherein information pertaining to the question additionally relates to the following:
whether the question can only be performed after a specified question has been answered; and
whether the question cannot be performed after a specified question has been answered.

5. An authoring tool as in claim 3 wherein information pertaining to the question particularly pertains to a symptom question and additionally relates to the following categories:
causes of a symptom;
probability of answers to the question conditional on causes that can cause the symptom; and,
probability of answers to the question conditional on no causes that can cause the symptom.

6. An authoring tool as in claim 3 wherein information pertaining to the question particularly pertains to a general question and additionally relates to the following categories:
prior probabilities of answers to the question;
causes that are affected by answers to the question; and,
probability of the affected causes conditional on each answer to the question.

7. An authoring tool that assists an author in building an automated diagnostic system, the authoring tool comprising:
an action editor interface that allows an author to place, in an action data structure, information pertaining to actions that can be taken, wherein for an action the information relates to the following:
costs of taking the action, and
trustworthiness of an answer to the action.

8. An authoring tool as in claim 7 wherein the information pertaining to the action additionally relates to the following:
an indication as to whether the action should be taken before other actions.

9. An authoring tool that assists an author in building an automated diagnostic system, the authoring tool comprising:
a question editor interface that allows an author to place, in a question data structure, information pertaining to questions that can be asked a user to help identify causes wherein for a question the information relates to the following:
costs of finding an answer to the question, and
trustworthiness of an answer to the question.

10. An authoring tool as in claim 9 wherein the information pertaining to the question additionally relates to the following:
whether the question can only be performed after a specified question has been answered; and
whether the question cannot be performed after a specified question has been answered.

11. An authoring tool as in claim 9 wherein information pertaining to the question particularly pertains to a symptom question and additionally relates to the following categories:
causes of a symptom;
probability of answers to the question conditional on causes that can cause the symptom; and,
probability of answers to the question conditional on no causes that can cause the symptom.

12. An authoring tool as in claim 9 wherein information pertaining to the question particularly pertains to a general question and additionally relates to the following categories:
prior probabilities of answers to a question;
causes that are affected by answers to the question; and,
probability of the affected causes conditional on each answer to the question.

13. An authoring tool that assists an author in building an automated selection system, the authoring tool comprising:
a selection editor interface that allows an author to place, in a selection data structure, information pertaining to selections;

an action editor interface that allows an author to place, in an action data structure, information pertaining to actions that can be taken in response to the selections; and a question editor interface that allows an author to place, in a question data structure, information pertaining to questions that can be asked a user of the product to help identify selections.

14. An authoring tool that assists an author in building an automated decision support system, the authoring tool comprising:

a situation editor interface that allows an author to place, in a situation data structure, information pertaining to situations;

an action editor interface that allows an author to place, in an action data structure, information pertaining to actions that can be taken in response to the situations; and a question editor interface that allows an author to place, in a question data structure, information pertaining to questions that can be asked a user of the product to help identify situations.

15. An authoring tool as in claim 1 wherein information pertaining to the action additionally relates to the following:

an indication whether the action is for information-gathering or is a potential solution.

16. An authoring tool as in claim 1 wherein information pertaining to the action additionally relates to the following:

probabilities that the action solves specified causes.

17. An authoring tool as in claim 1 wherein information pertaining to the action additionally relates to the following:

name of the action;
explanation of the action; and
causes solved by the action.

18. An authoring tool as in claim 1 wherein the information pertaining to the action additionally relates to the following:

an indication as to whether the action is a workaround.

19. An authoring tool as in claim 1 wherein the information pertaining to the action additionally relates to the following:

whether the action can only be performed after a specified question has been answered; and, whether the action cannot be performed after a specified question has been answered.

20. An authoring tool as in claim 3 wherein the information pertaining to the question additionally relates to the following:

an indication as to whether the question should be asked before other questions.

21. An authoring tool as in claim 3 wherein the information pertaining to the question additionally relates to the following:

whether the question is a symptom question or a general question.

22. An authoring tool as in claim 3 wherein the information pertaining to the question additionally relates to the following:

name of the question;
explanation of the question; and
names of answers.

23. An authoring tool as in claim 3 wherein the information pertaining to the question additionally relates to the following:

number of answers.

24. An authoring tool as in claim 7 wherein the information pertaining to the action additionally relates to the following:

an indication whether the action is for information-gathering or is a potential solution.

25. An authoring tool as in claim 7 wherein the information pertaining to the action additionally relates to the following:

probabilities that the action solves specified causes.

26. An authoring tool as in claim 7 wherein the information pertaining to the action additionally relates to the following:

name of the action;
explanation of the action; and
causes solved by the action.

27. An authoring tool as in claim 7 wherein the information pertaining to the action additionally relates to the following:

an indication as to whether the action is a workaround.

28. An authoring tool as in claim 7 wherein the information pertaining to the action additionally relates to the following:

whether the action can only be performed after a specified question has been answered; and whether the action cannot be performed after a specified question has been answered.

29. An authoring tool as in claim 9 wherein for a question the information additionally relates to the following:

name of the question;
explanation of the question; and
names of answers.

30. An authoring tool as in claim 9 wherein for a question the information additionally relates to the following:

number of answers.

31. An authoring tool as in claim 9 wherein the information pertaining to the question additionally relates to the following:

an indication as to whether the question should be taken before other questions.

32. An authoring tool as in claim 9 wherein the information pertaining to the question additionally relates to the following:

whether the question is a symptom question or a general question.

* * * * *